(12) United States Patent
    Siddiqui

(10) Patent No.: US 11,231,023 B2
(45) Date of Patent: Jan. 25, 2022

(54) ELECTROTHERMAL RADIO FREQUENCY THRUSTER AND COMPONENTS

(71) Applicant: PHASE FOUR, INC., El Segundo, CA (US)

(72) Inventor: Mohammed Umair Siddiqui, El Segundo, CA (US)

(73) Assignee: PHASE FOUR, INC., El Segundo, CA (US)

( * ) Notice: Subject to any disclaimer, the term of this patent is extended or adjusted under 35 U.S.C. 154(b) by 0 days.

(21) Appl. No.: 16/165,138

(22) Filed: Oct. 19, 2018

(65) Prior Publication Data

US 2019/0107104 A1  Apr. 11, 2019

Related U.S. Application Data

(63) Continuation of application No. 15/982,862, filed on May 17, 2018, now abandoned.

(60) Provisional application No. 62/569,838, filed on Oct. 9, 2017.

(51) Int. Cl.
    *F03H 1/00* (2006.01)
    *B64G 1/40* (2006.01)
    *H05H 1/46* (2006.01)

(52) U.S. Cl.
    CPC .......... *F03H 1/0093* (2013.01); *B64G 1/402* (2013.01); *B64G 1/405* (2013.01); *F03H 1/0081* (2013.01); *H05H 1/46* (2013.01); *H05H 1/4652* (2021.05)

(58) Field of Classification Search
    CPC .. H01J 37/3222; H01J 37/3211; H01J 27/143; H01J 27/146; H01J 27/16; H05H 2001/4667; F03H 1/0037; F03H 1/0043; F03H 1/005; F03H 1/0056; F03H 1/0012
    See application file for complete search history.

(56) References Cited

U.S. PATENT DOCUMENTS

| 2,992,345 A | 7/1961 | Hansen |
| 3,173,248 A | 3/1965 | Curtis et al. |
| 3,388,291 A | 6/1968 | Cann |
| 4,862,032 A | 8/1989 | Kaufman et al. |
| 5,339,623 A | 8/1994 | Smith |
| 5,418,431 A | 5/1995 | Williamson et al. |
| 5,751,113 A | 5/1998 | Yashnov et al. |
| 5,945,781 A | 8/1999 | Valent |

(Continued)

FOREIGN PATENT DOCUMENTS

| CN | 104411082 A | 3/2015 |
| EP | 3560298 A1 | 10/2019 |

(Continued)

OTHER PUBLICATIONS

Courtney "Diverging Cusped-Field Hall Thruster (DCHT)" (Year: 2007).*

(Continued)

*Primary Examiner* — Arun Goyal
*Assistant Examiner* — William L Breazeal
(74) *Attorney, Agent, or Firm* — Steinfl + Bruno, LLP

(57) ABSTRACT

The invention provides an electrothermal RF plasma production system and thruster design, and associated components, that may be used in terrestrial applications and/or miniaturized to the mass, volume, and power budget of Cube Satellites (CubeSats) to meet the propulsion needs of the small satellite (~5 to ~500 kg) constellations and larger satellite buses.

22 Claims, 11 Drawing Sheets

(56) References Cited

U.S. PATENT DOCUMENTS

| | | | |
|---|---|---|---|
| 6,293,090 | B1 | 9/2001 | Olson |
| 6,449,941 | B1 | 9/2002 | Warboys et al. |
| 6,771,026 | B2 | 8/2004 | Vukovic |
| 7,176,469 | B2 | 2/2007 | Leung et al. |
| 7,400,096 | B1* | 7/2008 | Foster .................. H01J 7/24 315/111.41 |
| 7,461,502 | B2* | 12/2008 | Emsellem ............ F03H 1/0081 60/202 |
| 7,498,592 | B2 | 3/2009 | Hershkowitz et al. |
| 8,593,064 | B2 | 11/2013 | Chang Diaz |
| 8,635,850 | B1 | 1/2014 | Light et al. |
| 8,729,806 | B2 | 5/2014 | Kwan et al. |
| 8,875,485 | B2 | 11/2014 | Keidar et al. |
| 9,215,789 | B1 | 12/2015 | Hala et al. |
| 9,591,741 | B2 | 3/2017 | Larigaldie |
| 11,067,065 | B2 | 7/2021 | Siddiqui et al. |
| 2002/0008451 | A1 | 1/2002 | Gibson |
| 2010/0213851 | A1 | 8/2010 | Chang Diaz |
| 2012/0080148 | A1 | 4/2012 | Zhang |
| 2012/0217876 | A1 | 8/2012 | Diamant et al. |
| 2013/0067883 | A1* | 3/2013 | Emsellem ............ F03H 1/0081 60/202 |
| 2013/0200219 | A1* | 8/2013 | Marchandise ........ F03H 1/0012 |
| 2014/0202131 | A1* | 7/2014 | Boswell .................... F03H 1/00 60/202 |
| 2014/0263181 | A1 | 9/2014 | Park |
| 2016/0200458 | A1 | 7/2016 | Longmier et al. |
| 2016/0207642 | A1 | 7/2016 | Longmier et al. |
| 2018/0310393 | A1* | 10/2018 | Castillo Acero ......... H05H 1/54 |
| 2019/0107103 | A1 | 4/2019 | Siddiqui |
| 2019/0390662 | A1 | 12/2019 | Siddiqui et al. |

FOREIGN PATENT DOCUMENTS

| | | | | |
|---|---|---|---|---|
| JP | 6263179 | * | 3/1987 | ............... F03H 1/00 |
| WO | WO 2015/031447 A1 | | 3/2015 | |
| WO | WO 2015/031450 A1 | | 3/2015 | |
| WO | WO 2018/118223 A1 | | 6/2018 | |
| WO | WO 2019/074785 A1 | | 4/2019 | |

OTHER PUBLICATIONS

Otto "Introduction and Review of Basic Plasma Properties" (Year: 2019).*
Wikipedia Gyroradius (Year: 2019).*
Wikipedia Electron Cyclotron Resonance (Year: 2019).*
Gilland "Helicon Wave Physics Impacts On Electrodeless Thruster Design" (Year: 2007).*
Longmier "Ambipolar ion acceleration in an expanding magnetic nozzle" (Year: 2011).*
WO, PCT/US2018/054555 ISR and Written Opinion, dated Dec. 7, 2018.
Bathgate, S. N., et al., "Electrodeless plasma thrusters for spacecraft: a review", Plasma Science and Technology, 2017, vol. 19, pp. 1-24.
Bonoli, P. T., "Review of recent experimental and modeling progress in the lower hybrid range of frequencies at ITER relevant parameters", Physics of Plasmas, 2014, vol. 21, pp. 061508-1-061508-22.
Cannat, F., et al., "Optimization of a coaxial electron cyclotron resonance plasma thruster with an analytical model", Physics of Plasmas, 2015, vol. 22, pp. 053503-1-053503-11.
Chabert, P., et al., "Physics of Radio-Frequency Plasmas", Cambridge University Press, 2011, p. 275.
Chen, F. F., et al., "Upper Limit to Landau Damping in Helicon Discharges", Physical Review Letters, 1999, vol. 82, No. 13, pp. 2677-2680.
Chen, F. F., "Helicon discharges and sources: a review", Plasmas Sources Sci. Technol., 2015, vol. 24, pp. 1-25.
Choi, G., "13.56 MHz, Class-E, 1KW RF Generator using a Microsemi DRF1200 Driver/MOSFET Hybrid", retrieved from www.microsemi.com, 2013, pp. 1-10.

Choueiri, E. Y., et al., "Coherent Ion Acceleration using Two Electrostatic Waves", 36th AIAA/ASME/SAE/ASSE Joint Propulsion Conference, Huntsville, AL, 2000, pp. 1-12.
Collard, T. A., et al., "A Numerical Examination of the Performance of Small Magnetic Nozzle Thrusters", 53rd AIA/SAE/ASEE Joint Propulsion Conference, 2017, pp. 1-16.
Dedrick, J., et al., "Transient propagation dynamics of flowing plasmas accelerated by radio-frequency electric fields", Physics of Plasmas, 2017, vol. 24, pp. 050703-1-050703-4.
Ellingboe, A. R., et al., "Electron beam pulses produced by heliconwave excitation", Physics of Plasmas, 1995, vol. 2, No. 6, pp. 1807-1809.
Gerwin, R. A., "Integrity of the Plasma Magnetic Nozzle", Los Alamos National Laboratory, Los Alamos, New Mexico, 2009, NASA/TP-2009213439, pp. 1-120.
Gilland, J., et al., "Neutral pumping in a helicon discharge", Plasmas Sources Sci. Technol., 1988, pp. 416-422.
Hofer, R. F., et al., "A Comparison of Nude and Collimated Faraday Probes for Use with Hall Thrusters", 27th International Electric Propulsion Conference, Pasadena, CA, 2001, pp. 1-17.
Hopwood, J., "Review of inductively coupled plasmas for plasma processing", Plasma Sources Sci. Technol., 1992, vol. 1, pp. 109-116.
Hsu, A. G., et al., "Laboratory Testing of a Modular 8-Thruster Scalable Ion Electrospray Propulsion System", retrieved from https://iepc2017.org/sites/default/files/speaker-papers/aiaa_iepc_paper_electrospray_hsu_final.pdf on May 17, 2018, pp. 1-12.
Huba, J.D., "NRL Plasma Formulary", Naval Research Laboratory, Washington DC, 2013. pp. 1-71.
Jacobson, V. T., et al., "Development of VASIMR Helicon Source", 43nd Annual Meeting of the APS Division of Plasma Physics Mini-Conference on Helicon Sources, Long Beach, California, 2001, pp. 1-35.
Kikuchi, T., et al., "Plasma Production and Wave Propagation in a Plasma Source Using Lower Hybrid Waves", Jpn. J. Appl. Phys., 1999, vol. 38, pp. 4351-4356.
Kinder, R. L., et al., "Noncollisional heating and electron energy distributions in magnetically enhanced inductively coupled and helicon plasma sources", Journal of Applied Physics, 2001, vol. 90, No. 8, pp. 3699-3712.
Liou, J. J., et al., "RF MOSFET: recent advances, current status and future trends", Solid-State Electronics, 2003, vol. 47, pp. 1881-1895.
Longmier, B. W., et al., "Ambipolar Ion Acceleration in the Expanding Magnetic Nozzle of the VASIMR® VX-200i", 45th AIAA/ASME/SAE/ASEE Joint Propulsion Conference & Exhibit, Denver, Colorado, 2009, pp. 1-10.
Longmier, B. W., et al., "VX-200 Magnetoplasma Thruster Performance Results Exceeding Fifty-Percent Thruster Efficiency", Journal of Propulsion and Power, 2011, vol. 27, No. 4, pp. 915-920.
Magee, R. M., et al., "Direct measurements of the ionization profile in krypton helicon plasmas", Physics of Plasmas, 2012. vol. 19, pp. 123506-1-123506-6.
Nakamura, T., et al., "Direct Measurement of Electromagnetic Thrust if Electrodeless Helicon Plasma Thruster Using Magnetic Nozzle", World Academy of Science, Engineering, and Technology, 2012, vol. 6, No. 11, pp. 581-585.
Nishiyama, K., et al., "Development and Testing of the Hayabusa2 Ion Engine System", Joint Conference of 30th International Symposium of Space Technology and Science 34th International Electric Propulsion Conference and 6th Nano-satellite Symposium, Hyogo-Kobe, Japan, 2015, pp. 1-15.
Pavarin, D., et al., "Design of 50 W Helicon Plasma Thruster", 31$^{st}$ International Electric Propulsion Conference, Ann Arbor, Michigan, Sep. 20-24, 2009, pp. 1-8.
Scime, E. E., et al., "The hot hELicon experiment (HELIX) and the large experiment on instabilities and anisotropy (LEIA)", J. Plasma Physics, 2014, pp. 1-22.
Shabshelowitz, A., et al., "Performance and Probe Measurements of a Radio-Frequency Plasma Thruster", Journal of Propulsion and Power, 2013, vol. 29, No. 4, pp. 919-929.
Siddiqui, M. U. et al., "Electron heating and density production in microwave-assisted helicon plasmas", Plasma Sources Sci. Technol., 2015, vol. 24, pp. 1-13.

(56) References Cited

OTHER PUBLICATIONS

Siddiqui, M. U., et al., "First Performance Measurements of the Phase Four RF Thruster", 35th International Electric Propulsion Conference, Atlanta, GA, 2017, pp. 1-21.
Siddiqui, M.U., "Updated Performance Measurements of the Phase Four RF Thruster", 34th Space Symposium, 2018, pp. 1-7.
Stephan, K. et al., "Absolute partial electron impact ionization cross sections of Xe from threshold up to 180 eV", Journal of Chemical Physics, 1984, vol. 81, No. 7, pp. 3116-3117.
Takahashi, K., et al., "Direct thrust measurement of a permanent magnet helicon double layer thruster", Applied Physics Letters, 2011, vol. 98, pp. 141503-1-141503-3.
Williams, L. T., et al., "Thrust Measurements of a Radio Frequency Plasma Source", Journal of Propulsion and Power, 2013, vol. 29, No. 3, pp. 520-527.
EP, 17882721.8 Extended Search Report, dated Jul. 14, 2020.
WO, PCT/US17/59096 ISR and Written Opinion, dated Jan. 29, 2018.
Blackwell, D. D., et al., "Two-dimensional imaging of a helicon discharge", Plasma Sources Science and Technology, 1997, vol. 6, pp. 569-576.
Boswell, R. W., "Very Efficient Plasma Generation By Whistler Waves Near the Lower Hybrid Frequency", Plasma Physics and Controlled Fusion, 1984, vol. 26, No. 10, pp. 1147-1162.
Longmier, B. W., et al., "Ambipolar ion acceleration in an expanding magnetic nozzle", Plasma Sources Science and Technology, 2011, vol. 20, pp. 1-9.
Plihon, N., et al., "Experimental investigation of double layers in expanding plasmas", Physics of Plasmas, 2007, vol. 14, pp. 013506-1-013506-16.
Power, J. L., et al., "Development of a High Power Microwave Thruster, With a Magnetic Nozzle, for Space Applications", 24th Microwave Power Symposium, Stamford, Connecticut, 1989, pp. 1-28.
Takahashi, K., et al., "Ion acceleration in a solenoid-free plasma expanded by permanent magnets", Physics of Plasmas, 2008, vol. 15, pp. 084501-1-084501-4.
Yildiz, M. S., "Global Energy Transfer Model of Microwave Induced Plasma in a Microwave Electrothermal Thruster Resonant Cavity", Joint Conference of 30th International Symposium on Space Technology and Science, 34th International Electric Propulsion Conference and 6th Nano-satellite Symposium, Hyogo-Kobe, Japan, 2015, pp. 1-10.
BC wire "Copper Magnet Wire" (Year: 2015).
Final Office Action for U.S. Appl. No. 15/982,862, filed May 17, 2018 on behalf of Phase Four Inc dated Nov. 2, 2020 39 pages.
Final Office Action for U.S. Appl. No. 16/439,205, filed Jun. 12, 2019 on behalf of Phase Four Inc dated Nov. 24, 2020 19 pages.
Non-Final Office Action for U.S. Appl. No. 15/982,862, filed May 17, 2018 on behalf of Phase Four Inc dated Jan. 22, 2020 39 pages.
Non-Final Office Action for U.S. Appl. No. 16/439,205, filed Jun. 12, 2019 on behalf of Phase Four Inc dated Feb. 5, 2020 19 pages.
Charles C. "Topical Review: Plasmas for spacecraft propulsion" Journal of Physics D: Applied Physics, vol. 42, No. 16, Aug. 2009, 18 pages.
Extended European Search Report for EP Application No. 18865461.0 filed on Oct. 15, 2018 on behalf of Phase Four Inc. dated Jun. 9, 2021 14 pages.
Gerst D. et al., "Plasma drift in a low-pressure magnetized radio frequency discharge" Plasma Sources Science and Technology Institute of Physics Publishing, vol. 22 No. 1, Jan. 2013, 6 pages.
Kolobov V. I. et al., "Review Article: The anomalous kin effect in gas discharge plasmas" Plasma Sources Science and Technology Institute of Physics Publishing, vol. 6 No. 2, May 1997, 17 pages.
Motomura T. et al., "Characteristics of large diameter, high-density helicon plasma with short axial length using a flat spiral antenna" Journal of Plasma and Fusion Research Series, vol. 8, Sep. 2009, 5 pages.
Takahashi K. et al., "Effect of magnetic and physical nozzles on plasma thruster performance" Plasma Sources Science and Technology Institute of Physics Publishing, vol. 23 No. 4, Jul. 2014, 9 pages.
Notice of Allowance for U.S. Appl. No. 16/439,205, filed Jun. 12, 2019, on behalf of Phase Four Inc. dated Jun. 10, 2021. 9 Pages.
EP Communication pursuant to Article 94(3) EPC for EP Application No. 17882721.8 filed on Oct. 30, 2017 on behalf of Phase Four, Inc. dated Nov. 10, 2021, 8 pages.
Takahiro N. et al., "Thrust Performance of High Magnetic Field Permanent Magnet Type Helicon Plasma Thruster" *50th AIAA/ASME/SAE/ASEE Joint Propulsion Conference*, Jul. 2014, pp. 1-8.

\* cited by examiner

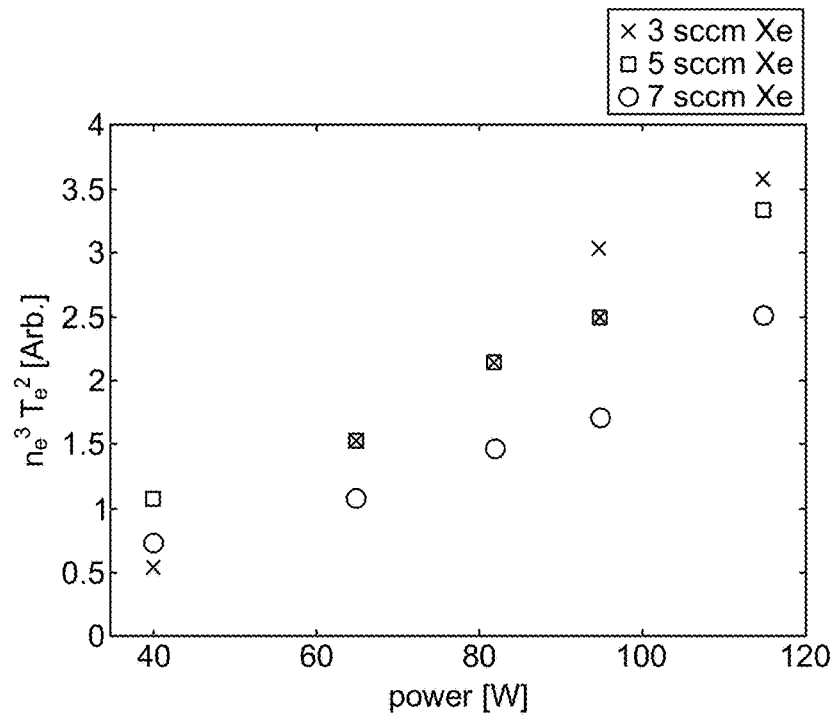
FIG. 3
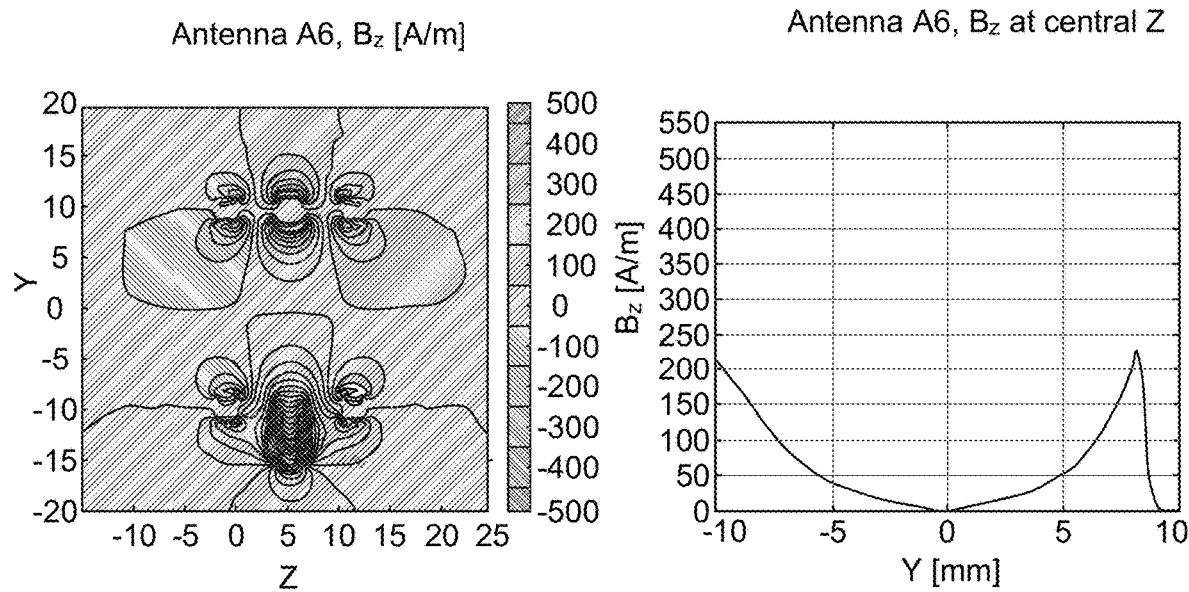
FIG. 4A
FIG. 4B

ELECTROTHERMAL RADIO FREQUENCY THRUSTER AND COMPONENTS

CROSS-REFERENCE TO RELATED APPLICATIONS

This application is a continuation of U.S. patent application Ser. No. 15/982,862, filed May 17, 2018, which claims benefit of U.S. Provisional Application 62/569,838, filed Oct. 9, 2017, both of which are hereby incorporated by reference in their entireties.

FIELD OF THE INVENTION

This invention generally relates to plasma production and control devices and associated components that may be used, for example, in the field of satellite propulsion including thrusters.

STATEMENT OF GOVERNMENT-SPONSORED RESEARCH

N/A.

BACKGROUND OF THE INVENTION

Radio frequency (RF) thrusters are electric propulsion systems that use radio frequency electromagnetic signals to accelerate a plasma propellant, thereby generating thrust. RF thrusters vary widely in power budget and plasma-acceleration mechanism. Electromagnetic RF thrusters, such as the multi-kW scale VAriable Specific Impulse Magnetoplasma Rocket (VASIMR) engine[1] and the lower power Beating Electrostatic Wave (BEW) thruster concept,[2] use electromagnetic forces to accelerate ions. Electrostatic RF thrusters, such as the Helicon Double Layer Thruster (HDLT)[3] and the Neptune thruster,[4] use both free-standing DC and applied RF electric fields to accelerate ions. Electrothermal RF thrusters, such as electron cyclotron resonance thrusters,[5,6] drive ion acceleration primarily through heating of constituent plasma particles via the applied RF signals.

Using RF systems for electric propulsion presents several advantages. First, a considerable knowledge base of RF plasma generation and heating already has been established through on-going efforts in the plasma processing and plasma fusion communities.[7,8] Second, RF plasma systems can efficiently generate very highly ionized plasmas with relatively moderate to low input RF power, ultimately increasing an RF thruster's efficiency.[9-11] Third, RF electronic active components have been miniaturized largely through the progress made by the cellular and wireless power industries,[12] increasing their suitability for low mass budget spacecraft applications.[23]

SUMMARY OF THE INVENTION

The present invention provides an electrothermal RF plasma production system and thruster design, and associated components, that may be used in terrestrial applications, in large-scale satellite propulsion systems, and/or miniaturized to the mass, volume, and power budget of Cube Satellites (CubeSats) to meet the propulsion needs of the small satellite (~5 to ~500 kg) constellations and larger satellites. In some embodiments, thruster designs that incorporate this plasma production system may be simple, scalable, and effective, and may be produced in large quantities using low-cost mass manufacturing techniques. The present designs and elements eliminate the use of erosive electrodes and high voltage electronics which increase the cost, complexity, and/or manufacturing difficulty associated with other plasma production/thruster designs.

In one aspect, the invention provides a plasma production device comprising:
(a) a substantially cylindrical plasma production chamber having a cylinder body, a first closed end, and a second open end;
(b) a magnet system comprising one or more radially-disposed magnets configured to establish a magnetic field within the plasma production chamber and oriented substantially parallel to a central longitudinal axis of the plasma production chamber (i.e., the cylinder body) such that each magnet produces a magnetic field of the same polarity within the plasma production chamber;
(c) a propellant tank and a flow regulator in communication with the plasma production chamber and configured to deliver a gaseous propellant from the propellant tank into the plasma production chamber; and
(d) a radio frequency (RF) antenna external to the plasma production chamber, electrically coupled to an AC power source, and configured to deliver an RF energy to an interior portion of the plasma production chamber;
wherein the plasma production device is configured to ionize and heat substantially all of a plasma by inductive heating.

In another aspect, the invention provides a plasma production device comprising:
(a) a substantially cylindrical plasma production chamber having a cylinder body, a first closed end, and a second open end;
(b) a magnet system comprising one or more radially-disposed magnets configured to establish a magnetic field within the plasma production chamber and oriented substantially parallel to a central longitudinal axis of the plasma production chamber (i.e., the cylinder body) such that each magnet produces a magnetic field of the same polarity within the plasma production chamber;
(c) a propellant tank and a flow regulator in communication with the plasma production chamber and configured to deliver a gaseous propellant from the propellant tank into the plasma production chamber; and
(d) a radio frequency (RF) antenna external to the plasma production chamber, electrically coupled to an AC power source, and configured to deliver an RF energy to an interior portion of the plasma production chamber;
wherein the plasma production chamber radius ($R_L$) is equal to 1-7 times the skin depth ($\rho s$) of the RF energy.

In another aspect, the invention provides a plasma production device comprising:
(a) a substantially cylindrical plasma production chamber having a cylinder body, a first closed end, and a second open end;
(b) a magnet system comprising one or more radially-disposed magnets configured to establish a magnetic field within the plasma production chamber and oriented substantially parallel to a central longitudinal axis of the plasma production chamber (i.e., the cylinder body) such that each magnet produces a magnetic field of the same polarity within the plasma production chamber;

(c) a propellant tank and a flow regulator in communication with the plasma production chamber and configured to deliver a gaseous propellant from the propellant tank into the plasma production chamber; and (d) a radio frequency (RF) antenna external to the plasma production chamber, electrically coupled to an AC power source, and configured to deliver an RF energy to an interior portion of the plasma production chamber;

wherein the plasma production chamber radius ($R_L$) is equal to 1.1-5.0 times the Larmor orbit radius ($\rho_i$) of a plasma ion.

In another aspect, the invention provides a plasma production device comprising:

(a) a substantially cylindrical plasma production chamber having a cylinder body, a first closed end and a second open end;

(b) a magnet system comprising one or more radially-disposed magnets configured to establish a magnetic field within the plasma production chamber and oriented substantially parallel to a central longitudinal axis of the plasma production chamber (i.e., the cylinder body) such that each magnet produces a magnetic field of the same polarity within the plasma production chamber;

(c) a propellant tank and a flow regulator in communication with the plasma production chamber and configured to deliver a gaseous propellant from the propellant tank into the plasma production chamber; and (d) a radio frequency (RF) antenna comprising at least a spiral region (e.g., a flat spiral) external to the plasma production chamber, electrically coupled to an AC power source, and configured to deliver an RF energy to an interior portion of the plasma production chamber.

In some embodiments, the RF antenna comprises a first region that comprises a spiral (e.g., a flat spiral) and a second region that comprises a coil, helix, or half-helix. In some further embodiments the plane of the spiral region is perpendicular or substantially perpendicular to the longitudinal axis of the second region. In other embodiments, the RF antennal is an FSCH antenna, as described herein.

In another aspect, the invention provides a plasma production device comprising:

(a) a substantially cylindrical plasma production chamber having a cylinder body, a first closed end, and a second open end;

(b) a magnet system comprising one or more radially-disposed magnets configured to establish a magnetic field within the plasma production chamber and oriented substantially parallel to a central longitudinal axis of the plasma production chamber (i.e., the cylinder body) such that each magnet produces a magnetic field of the same polarity within the plasma production chamber;

(c) a propellant tank and a flow regulator in communication with the plasma production chamber and configured to deliver a gaseous propellant from the propellant tank into the plasma production chamber;

(d) a radio frequency (RF) antenna external to the plasma production chamber, electrically coupled to an AC power source, and configured to deliver an RF energy to an interior portion of the plasma production chamber;

wherein the RF energy frequency is less than 25% of an electron cyclotron frequency ($f_{ce}$) inside the production chamber.

In any of the foregoing aspects, the plasma production chamber radius ($R_L$) is equal to 1-7 times (e.g., 4-6 times) the skin depth ($\rho_s$) of the RF energy. In some embodiments, the skin depth is about 1.0-2.0 mm including about 1.2-1.9 mm, 1.4-1.8 mm, and about 1.0 mm, 1.1 mm, 1.2 mm, 1.3 mm, 1.4 mm, 1.5 mm, 1.6 mm, 1.7 mm, 1.8 mm, 1.9 mm, and 2.0 mm. It is understood that the plasma production device may be configured to produce skin depths that are greater or less than those recited here and may depend upon the size and composition of the plasma production chamber, the specific propellant, the antenna power and configuration, other design features of the plasma production device, and the performance characteristics desired by the user.

In any of the foregoing aspects, the plasma production chamber radius ($R_L$) is equal to 1.1-5.0 times (e.g., 1.1-4.0 and 1.1-3.0) the Larmor orbit radius ($\rho_i$) of a plasma ion. In some embodiments, the plasma ion temperature is about 0.1 eV (~1100 K) or about 0.08-0.12 eV, 0.09-0.11 eV including about 0.08 eV, 0.09 eV, 0.10 eV, 0.11 eV, 0.12 eV, 0.13 eV, 0.14 eV, or more.

In any of the foregoing aspects, the antenna is or comprises a coiled antenna. Optionally, the coiled antenna is right-handed. Optionally, the coiled antenna has 1-50 turns including, for example, at least 2, 3, 4, 5, 10, 15, 20, 25, 30, 35, 40, or 45 turns, or about 1-5, 1-10, 1-20, 1-30, 1-40, 2-5, 2-10, 2-20, 2-30, 2-40, 2-50, 5-10, 5-20, 5-30, 5-40, or 5-50 turns). In any of the foregoing aspects, the antenna is a flat spiral coil hybrid ("FSCH") antenna, as described herein. Optionally, the antenna (e.g., a coiled antenna or an FSCH antenna) is configured to cause a constructive interference in magnetic fields produced within the plasma production chamber. Optionally, the antenna (e.g., a coiled antenna or an FSCH antenna) is configured to seed and accelerate electrons on a plurality of (including a substantial majority, or even every) magnetic field lines inside the plasma production chamber. Other antenna designs for use in any of the foregoing aspects include half-helix, helical, and flat spiral antennas.

In any of the foregoing aspects, the RF energy frequency is less than 25% (e.g., less than 20%, 15%, 10% or 5%) of an electron cyclotron frequency ($f_{ce}$) in a substantial majority, majority, or throughout the entirety of the plasma production chamber.

In any of the foregoing aspects, the magnet system comprises a first radially-disposed magnet toward the first closed end and a second radially-disposed magnet toward the second open end. Optionally, the first radially-disposed magnet produces a first throat region within the plasma production chamber, the second radially-disposed magnet produces a second throat within the plasma production chamber, and the first throat region and the second throat region are separated by a plasma containment region having a lower magnetic field strength than either of the first throat region or the second throat region. In some configurations, the first throat region has substantially the same or a higher magnetic field strength than the second throat region.

Optionally, the magnet system comprises at least one planar magnet (e.g., 1, 2, 3, 4, 5, 6, or more, or 1-2, 1-3, 1-4, 1-5, 1-6 or more, or 2-3, 2-4, 2-5, 2-6 or more, or 3-4, 3-5, 3-6 or more, or 4-5 or 4-6 or more) disposed before the first radially-disposed magnet (i.e., closer to the first closed end), wherein the at least one planar magnet produces a magnetic field of the same polarity within the plasma production chamber as the one or more radially-disposed magnets, and wherein the magnetic field of the at least one planar magnet is substantially parallel to the longitudinal axis of the plasma production chamber.

In any of the foregoing aspects, the plasma production device comprises 1-20 radially-disposed magnets (e.g., 1, 2, 3, 4, 5, 6, 8, 10, 12, 14, 16, 18, or 20, or 2-20, 2-10, 2-8, 2-6, or 2-4, or 4-20, 4-10, 4-8, or 4-6). In some embodiments, the radially-disposed magnets are annular magnets.

In some embodiments, the magnets and/or magnet system is adapted and configured to produce a magnetic field inside the plasma production chamber of greater than at least 250, 260, 270, 280, 290, 300, 310, 320, 330, 340, 350, 360, 370, 380, 390, or 400 Gauss, or more in the coaxial direction throughout the length of the plasma production chamber. In some embodiments, the minimum magnetic field strength over the length of the plasma production chamber about 250-400 Gauss, 250-500 Gauss, 300-400 Gauss, or 300-500 Gauss.

In any of the foregoing aspects, the radially-disposed magnets and/or the planar magnet(s), independently, are electromagnets, permanent magnets, or combinations thereof.

In any of the foregoing aspects, the RF energy has a frequency of 3-300 MHz.

In any of the foregoing aspects, the propellant tank and flow regulator are in communication with the plasma production chamber through the first (closed) end and configured to deliver the gaseous propellant along the central longitudinal axis, or an axis parallel thereto. Alternatively, the propellant tank and flow regulator are in communication with the plasma production chamber through the cylinder body and, optionally, deliver the gaseous propellant along an axis perpendicular, substantially perpendicular, or at about 15°, 30°, 45°, 60°, or 75° to the central longitudinal axis.

In some embodiments, the propellant (e.g., xenon) flow rate is about 0.01 to 2.0 mg/second including, for example, 0.05-2.0 mg/sec., 0.05-1.0 mg/sec, 0.05-0.75 mg/sec., 0.05-0.5 mg/sec, 0.1-2.0 mg/sec., 0.1-1.0 mg/sec, 0.1-0.75 mg/sec., 0.1-0.5 mg/sec, including about 0.01, 0.05, 0.10, 0.20, 0.30, 0.40, 0.50, 0.60, 0.70, 0.80, 0.90, and 1.0 mg/sec. The foregoing flow rates are exemplary and not intended to be limiting. It is understood that higher or lower propellant flow rates may be used depending upon the size, power, and other design features of the plasma production device, the specific propellant used, and the performance characteristics desired by the user.

In some embodiments, the AC power source provides 25-500 W to the antenna including, for example, about 50-500 W, 50-250 W, or about 25 W, 50 W, 75 W, 100 W, 150 W, 200 W, 250 W, 300 W, 350 W, 400 W, 450 W, and 500 W. In some embodiments, the AC power is less than 150 W, 200 W, 250 W, 300 W, 350 W, 400 W, 450 W, and 500 W. It is understood that higher or lower power may be used depending upon the size, propellant, and other design features of the plasma production device, and the performance characteristics desired by the user.

In some embodiments, the plasma production chamber is sized, and the plasma production device is adapted and configured to ionize at least about 50%, 55%, 60%, 65%, 70%, 75%, 80%, 85%, 90%, 95%, or 99% of the propellant into plasma. In some embodiments, the plasma production chamber has a length, from the closed end to the open end, of about 15-100 mm including about 20-75 mm and 25-50 mm, and about 15 mm, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm. It is understood that the plasma production chamber may be shorter or longer and the specific length may vary according to the design features of the plasma production device, and the performance characteristics desired by the user.

In some embodiments, the plasma production device is configured and adapted such that the plasma production chamber has a radius ($R_L$) that is 2-10 times the skin depth, as described herein, including for example, about 3-9, 4-8, 5-8, and 5-7 times the skin depth and about 2, 3, 4, 5, 6, 7, 8, 9, and 10 times the skin depth.

In some embodiments, the radius ($R_L$) is about 5-20 mm including about 8-16 mm and about 10-15 mm, and about 6 mm, 8 mm, 10 mm, 12 mm, 14 mm, 16 mm, 18 mm, and 20 mm. It is understood that the plasma production chamber may have a smaller or larger radius and may vary according to the design features of the plasma production device, including the skin depth, and other performance characteristics desired by the user.

In some embodiments, the plasma production device is configured to produce a plasma density of about $10^{11}$-$10^{15}$ particles per $cm^3$ including about $10^{12}$-$10^{14}$ particles per $cm^3$ and about $10^{11}$, $10^{12}$, $10^{13}$, $10^{14}$, $10^{15}$ particles per $cm^3$.

In some embodiments of any of the foregoing aspects, the plasma production device is adapted and configured as follows:

(i) Propellant Flow Rate: 0.1-0.5 mg/second (e.g., xenon);
(ii) AC Power: 100-200 W (e.g., about 125 W or 150 W);
(iii) Plasma Production Chamber Length: about 25-50 mm;
(iv) Plasma Production Chamber Radius ($R_L$): 10-15 mm (e.g., 12 mm); and
(v) Minimum Magnetic Field Strength: 250-350 G (e.g., 300 G).

In another aspect, the invention provides a thrust-generating device (i.e., a thruster) including, for example, a satellite propulsion system (i.e., a satellite thruster) comprising a plasma production device of any of the foregoing aspects. In some embodiments, the thruster is electrodeless (i.e., lacks electrodes configured or adapted to produce plasma from the propellant).

In another aspect, the invention provides a flat spiral coil hybrid ("FSCH") antenna, as described herein. The FSCH comprises a flat spiral portion and a coiled portion, wherein the plane of the flat spiral portion is perpendicular or substantially perpendicular to the longitudinal axis of the coiled portion. The spiral portion begins at a central point and extends outwards. The spiral terminates in a connection to the coil portion. The electrical input into the FSCH antenna is at the beginning of the spiral portion at the central point In another aspect, the invention provides a device comprising (i) a cylindrical chamber having a cylinder body, a first closed end, and a second open end and (ii) an FSCH antenna comprising a flat spiral portion and a coiled portion, wherein the plane of the flat spiral portion is perpendicular or substantially perpendicular to the longitudinal axis of the coiled portion, wherein the spiral portion is disposed within, on, or adjacent to the first closed end and/or the coil portion is wound around the cylinder body and, optionally, embedded within the cylinder body or a groove on an outer surface of the cylinder body. The FSCH antenna is configured to cause a constructive interference in magnetic fields produced within cylinder body.

In some embodiments of the FSCH antenna in any of the foregoing aspects, the antenna is right-handed. In other embodiments, the antenna is left-handed.

In some embodiments of the FSCH antenna in any of the foregoing aspects, the coil portion is a half-helix. Optionally, the coiled portion of the FSCH antenna has 1-50 turns including, for example, at least 2, 3, 4, 5, 10, 15, 20, 25, 30, 35, 40, or 45 turns, or about 1-5, 1-10, 1-20, 1-30, 1-40, 2-5, 2-10, 2-20, 2-30, 2-40, 2-50, 5-10, 5-20, 5-30, 5-40, or 5-50 turns). Optionally, the spiral portion of the antenna has 1-50 turns including, for example, at least 2, 3, 4, 5, 10, 15, 20, 25, 30, 35, 40, or 45 turns, or about 1-5, 1-10, 1-20, 1-30, 1-40, 2-5, 2-10, 2-20, 2-30, 2-40, 2-50, 5-10, 5-20, 5-30, 5-40, or 5-50 turns).

In some embodiments of the FSCH antenna in any of the foregoing aspects, the FSCH antenna comprises a flat wire (i.e., forming a flat coil hybrid antenna ("FSCH")). In other embodiments, the FSCH comprises a round or oval wire.

In some embodiments of the FSCH antenna in any of the foregoing aspects, the FSCH antenna is operably connected to an electrical power source (e.g., a battery, a solar panel, and grid power). In some embodiments, the electrical power source is an AC power source.

By "AC power source" is meant an upstream component that provides alternating current to a downstream component. An AC power source may directly provide alternating current or may be the combination of a direct current (DC) power source and a DC-to-AC converter such as an inverter, and optionally a power amplifier. Optionally, the AC power source may be coupled to the antenna via a passive electrical circuit called a "matching network."

By "HF band" or "high frequency band" is meant the range of radio frequency (RF) or electromagnetic radiation waves having a frequency of 3-30 MHz.

By "ion" is meant the positively-charged plasma ions formed from the neutral propellant gas, as distinguished from the negatively-charged electrons.

By "plasma" is meant an ionized state of matter generated from a neutral propellant gas that primarily consists of free negatively-charged electrons and positively-charged ions, wherein, the density of charged particles, $n_e$ is greater than 0.5% of the density of total particles $n_T$ (charged and neutral) in the system, or $n_e/n_T>0.005$.

By "plasma liner" is meant the physical chamber in which the propellant is ionized to form plasma. In some embodiments, the plasma liner is cylindrical having a cylinder body, a closed end and an open end. Propellant may be introduced into the plasma liner through an aperture or nozzle in the closed end. Alternatively, the propellant may be introduced to the cylinder body (i.e., the side wall), as described herein. Typically, propellant will be introduced through the cylinder body at or near the closed end (i.e., within the upstream 5%, 10%, 15%, 20% or 25% of the cylinder body). The open end serves as an exit for the plasma which, in conjunction with the associated magnetic field described herein forms a nozzle for directing the plasma out of the plasma liner. The plasma liner may be constructed from, or lined with, any suitable material that is resistant to plasma-induced corrosion and/or erosion. Suitable plasma liner materials include, for example, various ceramics; such as alumina, boron nitride, aluminum nitride, and Macor®; glasses such as borosilicate, quartz, and Pyrex®; and refractory metals such as graphite, tungsten, carbon, tantalum, and molybdenum.

By "plume" is meant the area immediately outside of the open end of the plasma liner and is formed by the ejection of plasma ions and electrons from within the plasma liner. The "plume" may refer to the plume of the thruster generally, in thruster applications, or the plume of the plasma liner component of the thruster, specifically, from which the plasma ions are ejected.

By "propellant" is meant a neutral gas that is capable of being ionized into plasma. Typical propellants suitable for use in this invention include the noble gases including, for example, helium, neon, argon, krypton, xenon, and radon; molecules such as water, iodine, nitrogen ($N_2$), oxygen ($O_2$), air, methane ($CH_4$), and various hydrocarbon compounds; and alkali metals such as cesium, sodium, and potassium. Mixed noble gases and other gases may be used as a propellant.

By "VHF band" or "very high frequency band" is meant the range of radio frequency (RF) or electromagnetic radiation waves having a frequency of 30-300 MHz. including, for example the band at about 100-300 MHz, 150-300 MHz, 200-300 MHz, 100-250 MHz, 150-250 MHz, and 100-200 MHz.

DESCRIPTION OF DRAWINGS

FIG. 3 is a scatter plot showing the measured plume density-temperature product (y-axis) versus the square of the input power (x-axis) for three different propellant (xenon) flow rates in the plasma production/thruster device described herein.

FIG. 4A is a 2D projection of CST-modeled axial induced magnetic fields inside a plasma as driven by the A6 antenna design described herein. FIG. 4B is a cross-sectional illustration of the magnetic field strength versus radius (Ŷ) shown in FIG. 4A at Z=7 mm.

FIG. 6A shows plume temperature. FIG. 6B shows plume density. FIG. 6C shows relative current density. FIG. 6D shows relative current density per Watt of input power.

FIG. 10A shows the overall trace. FIG. 10B shows the overall trace minus the ion saturation current using a linear fit, zoomed to highlight the appearance of an electron beam signature, as marked by the downward arrow. FIG. 10C shows the natural logarithm of the electron current, highlighting the features generated by the fast electron beam and by the electron saturation. The inverse of the slopes of the dotted lines were not used to calculate electron temperature because the beam electrons must be subtracted first to accurately perform this calculation. FIG. 10D shows the first derivative of the electron current, highlighting the transition to electron saturation.

FIG. 14B is a scatter plot showing the measured specific impulse produced by the FSCH-RFT integrated thruster design described herein.

DETAILED DESCRIPTION

The present invention provides an electrothermal RF thruster design and associated components that may be miniaturized to the mass, volume, and power budget of Cube Satellites (CubeSats) to meet the propulsion needs of the small satellite (~5 to ~500 kg) constellations and all-electric satellite buses. Propulsion systems constructed according to the principles described herein may be simple, scalable, robust, and relatively inexpensive compared to existing systems using other propulsion technologies.

Plasma Production Apparatus

Figure 1:
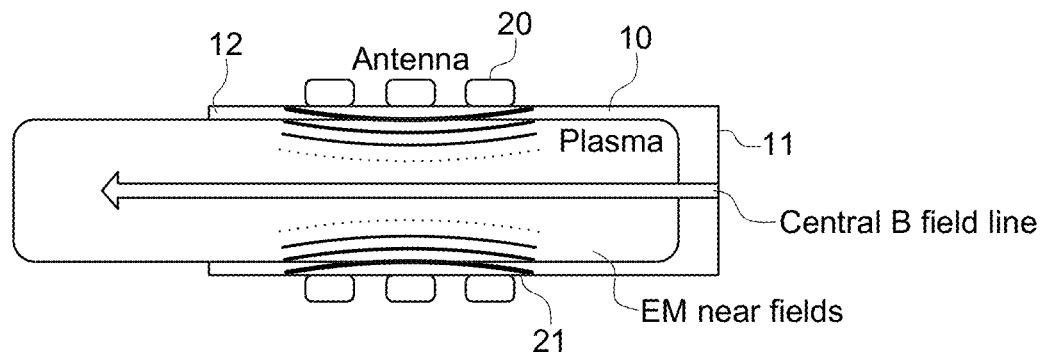
FIG. 1 is schematic diagram of a plasma production device illustrating the principles of the plasma liner, RF antenna, and injection of a neutral propellant gas.

FIG. 1 is a schematic diagram of the core components of the plasma production chamber and associated components. A propellant gas is injected into plasma liner 10 along the longitudinal axis of the (e.g., cylindrical) plasma liner from the closed end 11 in the direction of the open end 12. The plasma liner 10 is surrounded by an inductive RF antenna 20 through which an alternating current is driven at a specified RF frequency in the high frequency (HF) to very high frequency (VHF) bands (from 3 to 30 MHz and 30 to 300 MHz, respectively). The alternating current may be supplied from an alternating current power source (e.g., grid power) for example in certain terrestrial application, or from solar panels and/or DC batteries for other terrestrial and space (on-orbit) applications. It is well-known that DC current may be converted to AC through various means including, for example, an inverter, and if necessary, a power amplifier. Optionally, the AC power source is connected to antenna 20 through a series of passive electrical elements including, for example, an RF matching network. FIG. 1 illustrates antenna 20 as a coiled antenna for simplicity and to illustrate the principles of this invention. The coiled antenna is not limiting on the types of antennas that may be used in the various aspects of the invention.

The liner 10 and antenna 20 are positioned inside a generated magnetic field (not shown). The magnetic fields have a specified strength as a function of position within the plasma liner 10. The magnetic fields rapidly expand radially in the reference frame of an accelerated plasma particle traveling out of the liner 10 thereby forming a "magnetic nozzle". The magnetic field strength inside liner 10 is such that the ions that are generated within the liner 10 are "weakly magnetized," which implies that ions under a specific temperature perpendicular to the magnetic field will not have orbits that intersect the inner wall of liner 10. When neutral propellant gas is injected into liner 10, the induced oscillating magnetic fields generated by the currents in the antenna 20 both ionize the propellant gas, and then heat the subsequent plasma. Neither multiple RF stages, nor extra electron-generating mechanisms are used for RFT ignition or plasma heating. The heating directly impacts the electrons. Electrons are accelerated to very high energies ($\geq 50$ eV) through inductive and stochastic interactions with the near RF fields 21 from the antenna 20. The electrons, undergoing significant elastic collisions inside liner 10, expand rapidly along the magnetic field lines that run substantially parallel with the longitudinal walls of liner 10.

As described in more detail herein, the magnetic field geometry within liner 10 ensures that electrons maintain enough time in regions of high neutral (i.e., non-ionized propellant) density to produce significant ionization of the propellant gas via electron collisions with the neutral particles, and that electrons that are lost are largely lost via expansion in the magnetic nozzle, rather than upstream towards the closed end 11 of liner 10. The rapid flux of electrons into the plume of the thruster creates a momentary charge imbalance in the thruster. The slower positively-charged propellant (e.g., xenon) ions are then pushed out of the plasma liner 10 via the charge imbalance at a rate sufficient to satisfy overall ambipolar fluxes of particles out of the system. The ion acceleration generated therein is the primary source of thrust when plasma liner 10 and its associated components are integrated into a thruster.

Inductive Heating Effects on Plasma Liner Geometry

The RF fields 21 generated by the antenna that heat the plasma particles are directly induced by electrical currents in the antenna 20. Unlike wave-heated plasma discharges, the plasma in this production/thruster design is not heated by propagating (non-evanescent) waves launched in the plasma, such as in helicon discharges.[13] Unlike in "electron cyclotron resonance" sources, the RF signals need not be "resonant" with the particle motions in the plasma. The heating mechanism in this design is similar to heating mechanisms described by Kinder and Kushner[14] in simulations where their system was at low magnetic fields. In such systems, the fields induced by the antenna are partially shielded/attenuated by the motions of charged particles in the plasma. This is represented in FIG. 1 by the curved wave lines 21 emanating from antenna 20 with decreasing thickness as the lines penetrate the plasma. The scale length over which this decay occurs is determined by the plasma "skin depth,"[15]

$$\rho_s = \frac{c}{\omega_{pe}} \quad (1)$$

where $\rho_s$ is the skin depth, c is the speed of light in vacuum, and $\omega_{pe}$ is the electron plasma frequency in radians per second. The electron plasma frequency is given by:

$$\omega_{pe} = 5.64 \times 10^4 \sqrt{n_e} \quad (2)$$

where $n_e$ is the plasma electron density in particles per cubic cm (cm$^{-3}$).[16] From Equations 1 and 2, it can be seen that the skin depth is inversely proportional to the square root of the electron density. Therefore, with increasing plasma density, the antenna-induced wave field amplitudes decay more rapidly versus radial position in the plasma.

Figure 2:
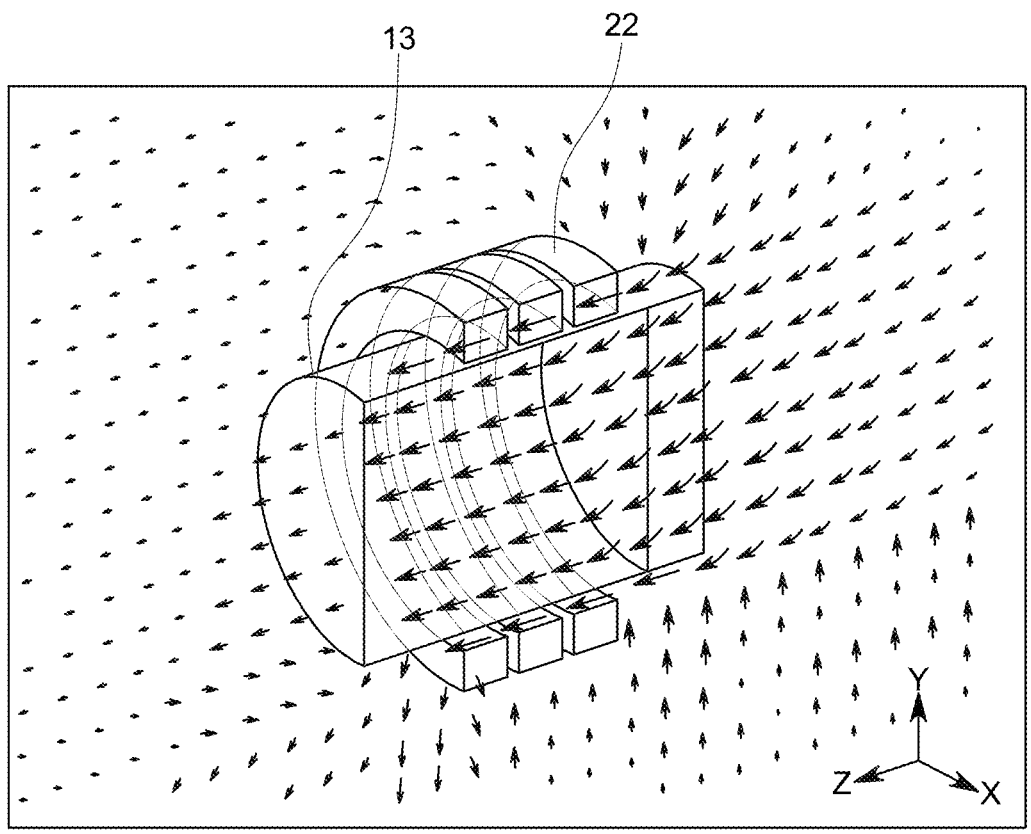
FIG. 2 is a CST simulation output showing the magnetic field strength and direction induced in a xenon plasma by the coiled antenna described herein.

The skin depth effect was simulated using a Computer Simulation Technologies (CST) simulation and the graphical results are shown in FIG. 2. The simulation used a coil antenna 22 wrapped around a plasma 13 with $n_e=10^{13}$ cm$^{-3}$, and a magnetic field of 600 Gauss uniform along the $\hat{z}$ axis. FIG. 2 shows a cut through the center of the antenna 22 and the plasma 13 in the $\hat{y}$–$\hat{z}$ plane. In the simulation, an RF signal was applied through antenna 22 and the resulting electromagnetic fields were calculated everywhere within the domain. The induced magnetic fields are represented by local vector arrows. The size and shade of the arrows represent the local strength of the fields with lighter/larger arrows being stronger and smaller/darker arrows being weaker. The fields near the antenna are strong, and the field strength decays the farther into the plasma the fields penetrate. It is well known that the induced axial magnetic field is largely uniform throughout the internal volume for multi-turn solenoid coils or antennas (such as the antenna 22 in FIG. 2) with a vacuum at the solenoid core. Therefore, the observed decay of the induced fields in the plasma indicates that the CST simulation is accurately exhibiting the known plasma skin depth effect.

As described above, these induced magnetic fields in the plasma heat the constituent particles. The oscillating magnetic fields from the antenna induce time-varying electric fields in the plasma, described by Faraday's Law, which subsequently drive currents and electron motions in the plasma. Some of the fast electrons ionize the neutral propellant background particles via electron impact, and other fast electrons escape the plasma liner, electrically pulling the slower positively charged ions out of the thruster, generating thrust or otherwise allowing the ions to escape the production chamber (i.e., in non-thrust-generating applications).

This method of energy transfer from the electrical antenna signal to the plasma is known as "inductive coupling," and has been well documented and studied in the plasma processing community.[7] Therefore, the magnitude of the induced electric fields that accelerate fast electrons are directly proportional to the amplitudes of the local oscillating magnetic fields driven by the antenna. This "inductive" heating effect is most pronounced at the edges of the plasma near the antenna and weaken near the center of the plasma-antenna system. In existing RF plasma systems, the physical extent of plasma is significantly greater than 5-10 $\rho_s$. In those systems, the inductive heating effect occurs only in a small volume of plasma relatively close to the plasma liner wall, but not in the interior bulk of the plasma. These larger systems rely on more complicated coupling of induced fields to propagating waves in the plasma to deposit energy in the larger interior plasma volume (as in, for examples, reference 13, 14, and 17).

In one aspect, the invention therefore provides a plasma production system (e.g., for use in a thruster) in which all or substantially all of the propellant is ionized and/or the plasma contained within the plasma production chamber (e.g., the plasma liner) is produced or heated by inductive heating induced by oscillating magnetic fields produced by the antenna. In particular, the dimension of the plasma production chamber (e.g., the plasma liner) as having a radius ($R_L$; radius of plasma liner) that is less than about 7 $\rho_s$, 6.5 $\rho_s$, 6 $\rho_s$, 5.5 $\rho_s$, 5 $\rho_s$, 4.5 $\rho_s$, 4 $\rho_s$, 3.5 $\rho_s$, 3 $\rho_s$, 2.5 $\rho_s$, or 2 $\rho_s$, or, $R_L$ is about 1-6 $\rho_s$, 2-6 $\rho_s$, 3-6 $\rho_s$, 4-6 $\rho_s$, 5-6 $\rho_s$, 1-5 $\rho_s$, 2-5 $\rho_s$, 3-5 $\rho_s$, 4-5 $\rho_s$, 1-4 $\rho_s$, 2-4 $\rho_s$, 3-4 $\rho_s$, 1-3 $\rho_s$, 2-3 $\rho_s$, or 1-2 $\rho_s$, or $R_L$ is about 1 $\rho_s$, 2 $\rho_s$, 3 $\rho_s$, 4 $\rho_s$, 5 $\rho_s$, 6 $\rho_s$, or 7 $\rho_s$. This relationship may be expressed mathematically as:

$$R_L \leq 1\text{-}7 \; \rho_s \quad (3)$$

When the propellant is xenon, the system is optimized when $R_L=3\text{-}6$ $\rho_s$ including, for example, when $R_L=4\text{-}6$ $\rho_s$, =5-6 $\rho_s$, =3-5 $\rho_s$, =3-4 $\rho_s$, or $R_L$ 3 $\rho_s$, 4 $\rho_s$, 5 $\rho_s$, or $R_L \approx 6$ $\rho_s$. It is understood that the cofactor in Equation (3) describing the relationship between $R_L$ and $\rho_s$ was determined in a simulation using a xenon propellant (FIG. 2). The cofactor describing this relationship may vary based on the propellant gas species, operational power and configuration of the antenna, and the magnetic field strength within the plasma liner.

Maintaining an appropriately small plasma liner radius realizes several advantages in all plasma production and propulsion RF systems, and particularly in miniaturized RF systems. Specifically, these advantages include:
(i) allowing for substantially simpler RF plasma systems that do not rely on complicated RF wave coupling;
(ii) maintaining a primarily single and dominant heating mechanism throughout the majority (substantially all) of the plasma volume, ensuring more simple optimization;
(iii) allowing for high RF-plasma volumetric power density which ensures high power deposition into the plasma with low electrical power input into the antenna, and
(iv) allowing for the thruster to be implemented in small satellite and CubeSatellite applications.

With the foregoing understanding of the relationship between the skin depth ($\rho_s$) and $R_L$, several design principles are established. Making the plasma liner radius too small results in too little plasma being heated, and too much plasma being lost to wall interactions, both of which greatly reduce thrust performance and/or total plasma output. Furthermore, the plasma liner must be large enough to allow for complete charged particle orbits to exist, i.e., that the ion and electron orbital motion around the magnetic fields in the liner must not intersect the liner walls. The ions, being generally significantly more massive than the electrons, have significantly larger magnetic "Larmor" orbits than the electrons, and thus become the bounding orbit on the minimum radius of the plasma liner. The average orbit of an ion, in a distribution of ions with temperature Ti, is given by:

$$\rho_i = \frac{\sqrt{M_i k_B T_i}}{eB} \quad (4)$$

where $\rho_i$ is the average ion Larmor orbit radius, $M_i$ is the ion mass, $k_B$ is Boltzmann's constant, e is the fundamental charge, and B is the background DC magnetic field strength.

Typical ion temperatures in such systems range from 0.02 eV to 10 eV, where 1 eV corresponds to 11,600 K. As an example, a typical situation for an RFT-2 discharge is a xenon plasma, with 0.1 eV ions, and 500 G background magnetic field, yielding $\rho_i$=7.4 mm.

Combining the previous two conditions, wherein $R_L \leq 5 \rho_s$ yields the geometrical bounds for the optimal size of the plasma liner to be:

$$\frac{\sqrt{M_i k_B T_i}}{eB} < R_L \lesssim \frac{5c}{5.64 \times 10^4 \sqrt{n_e}}. \quad (5a)$$

or, in a more simplified form:

$$\rho_i < R_L < (5c/\omega_{pe}) \quad (5b)$$

or $$\rho_i < R_L < 5 \rho_s \quad (5c)$$

In some embodiments, $R_L$ is greater than 1.1 $\rho_i$, 1.5 $\rho_i$, 2.0 $\rho_i$, 2.5 $\rho_i$, 3.0 $\rho_i$, 3.5 $\rho_i$, 4.0 $\rho_i$, or 4.5 $\rho_i$, but less than 5.0 $\rho_i$. In other embodiments, $R_L$ is greater than 1.1 $\rho_i$, 1.5 $\rho_i$, 2.0 $\rho_i$, 2.5 $\rho_i$, 3.0 $\rho_i$, 3.5 $\rho_i$, or 4.0 $\rho_i$, but less than 4.5 $\rho_i$. In other embodiments, $R_L$ is greater than 1.1 $\rho_i$, 1.5 $\rho_i$, 2.0 $\rho_i$, 2.5 $\rho_i$, 3.0 $\rho_i$, or 3.5 $\rho_i$, but less than 4.0 $\rho_i$. In other embodiments, $R_L$ is greater than 1.1 $\rho_i$, 1.5 $\rho_i$, 2.0 $\rho_i$, 2.5 $\rho_i$, or 3.0 $\rho_i$, but less than 3.5 $\rho_i$. In other embodiments, $R_L$ is at 1.1 $\rho_i$, 1.5 $\rho_i$, 2.0 $\rho_i$, 2.5 $\rho_i$, 3.0 $\rho_i$, 3.5 $\rho_i$, 4.0 $\rho_i$, or 4.5 $\rho_i$, but less than 3.0 $\rho_i$. In other embodiments, $R_L$ is at 1.1 $\rho_i$, 1.5 $\rho_i$, or 2.0 $\rho_i$, but less than 2.5 $\rho_i$.

Investigation into various other commercially-available and experimental CubeSat thruster designs found that those designs utilize a plasma liner that is too small, and does not fall within the bounds of Equation (5), resulting in very poor thruster efficiency and suboptimal performance.[22]

Example 1: Yield Calculation and Testing

This foregoing geometrical scaling theory yields a performance prediction as follows. The energy density in the plasma plume generated by the thruster (ϵ) approximately scales as the product of the electron temperature ($T_e$), and the electron density $\epsilon \sim n_e T_e$. This product should be directly proportional to the amount of plasma heated by the induced fields from the antenna, and the amplitude of these fields. Mathematically this is given as:

$$\epsilon \sim n_e T_e \sim \rho_s n_e \tilde{B}_0 \quad (6)$$

where $\tilde{B}_0$ is the peak amplitude of the fluctuating induced magnetic field in the plasma, generated by the antenna. $\tilde{B}_0$ is directly proportional to the square root of the RF power into the antenna $P_{rf}$). Using Eqns. 1, 2, and 6 therefore yields:

$$P_{rf} \sim n_e^3 T_e^2 \quad (7)$$

Thus, to validate that the operational mechanism of the plasma production system relies on near field inductive plasma heating, the measured input power can be compared to the measured plasma electron density and temperature at a fixed location in the plasma plume.

A plasma production system was constructed in accordance with the geometrical principles described above. Other details regarding the structure and operational parameters of this test system are found in the other working examples described herein.

FIG. 3 shows measurements of the product of $n_e^3$ and $T_e^2$ in the plume of the test system as a function of input power for three different xenon mass flow rates. One (1) "standard cubic centimeter per minute," or "sccm" corresponds closely to 0.1 mg/s of xenon. The density and temperature were measured in the plume using a Langmuir probe. As shown in FIG. 3, for each of the mass flow rates investigated thus far, the power law product scales approximately linearly with the input power, as predicted by the model of near field inductive heating described above. Thus, inductive heating is the dominant, if not sole, physical mechanism responsible for xenon ionization and plasma heating in the test system. Other modes of RF energy transfer do not appear to be present to any significant extent.

Antenna Geometry and Skin Depth

The specific geometry of the antenna has a strong effect on the heating efficacy in the plasma. The goal of the antenna design is to maximize "plasma loading." Plasma loading refers to the amount of propellant/plasma ionization and plasma heating, generated by the antenna, per unit (Watt) of input power. In near field inductive discharges, plasma loading is determined by the volume of the plasma exposed to the near fields from the antenna, which is determined by the surface area of the liner adjacent to the antenna and the skin depth of the RF fields in the plasma. As discussed above, the heating rate in the plasma is proportional to the skin depth and the amplitude of the RF signal. The skin depth also is partially determined by the antenna geometry. Another aim of the invention is to design antenna geometries that result in constructive interference with the induced magnetic and electric fields in the plasma, thereby increasing their local amplitudes and maximizing the plasma loading.

Figure 9:
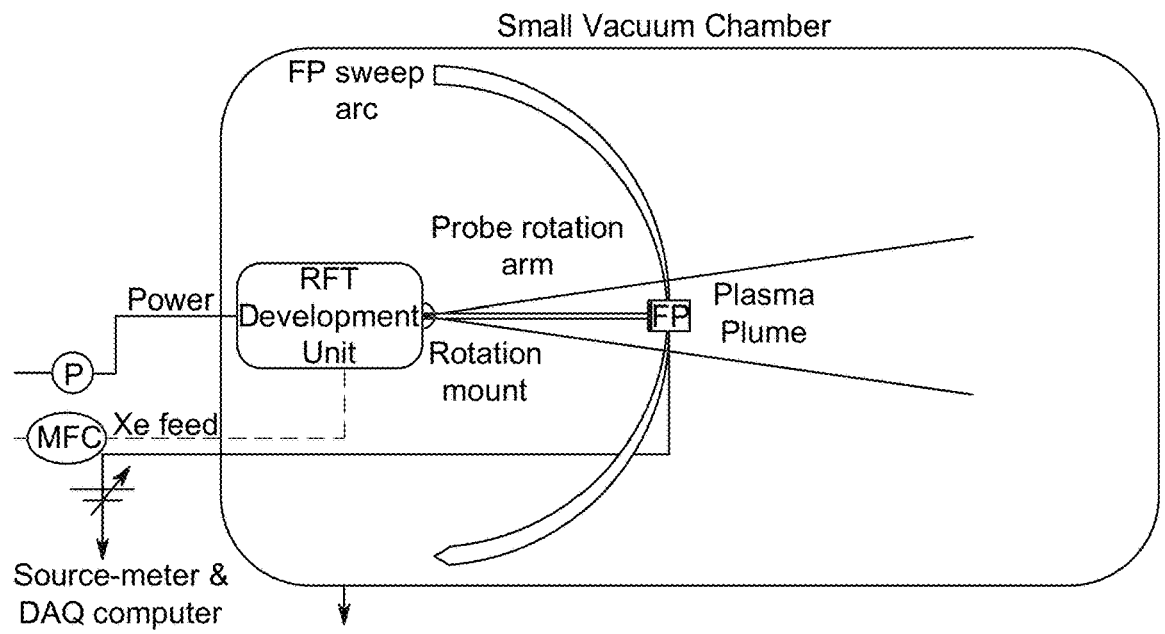
FIG. 9 is a schematic diagram of the setup for testing plasma production device/thruster plume. The plasma production device (RFT Development Unit) is mounted toward the end of the vacuum chamber having the feedthroughs. The Faraday probe (FP) is shown on a rotational mount collocated with the thruster orifice. Power (P) and mass flow control (MFC) are also shown.

FIGS. 4A-4B, 5A-5B, and 6A-6D illustrate the effect of antenna geometry. FIGS. 4A-B show the results of a CST simulation of the coaxial induced magnetic field for a defined RF current driven through an antenna, defined internally as 'A6.' Antenna A6 was a "half helical" antenna, as shown in FIG. 9 of Chen, 2015,[17] with an inner diameter and length of 17 mm each. The "half helix" geometry consists of two coaxial circular loops of conducting material with the same inner diameter, separated axially by a distance greater than their diameters and less than the length of the plasma liner they are wrapped around. The loops are electrically connected by at least two straps that travel in a helical fashion from the back loop to the front loop. If the straps rotate in a clockwise fashion from one loop to the next, the antenna is "right handed." Conversely if the straps travel in a counter clockwise fashion, the antenna is "left handed." The A6 antenna is right handed. Two "legs" are attached, one to either loop on the helix, which are designed to interface in an AC electrical circuit. The AC electrical current is applied to these legs to run currents through the geometry of the antenna, inducing electromagnetic fields in the antenna core, such that when a plasma is generated underneath the antenna it is heated by these fields.

For the simulation, a 2.5 A, 10 MHz sinusoidal current was driven through the antenna, approximately corresponding to a power of 100 W into the antenna. The plasma density modeled at the core of the antenna has a density of $10^{13}$ particles per cubic cm, which were exposed to a DC magnetic field of 500 Gauss oriented along the axis of the antenna uniformly. FIG. 4A shows a cut plane through the antenna and its central axis ($\hat{Z}$). The straps of the antenna are represented by the approximately rectangular shapes at Y=±10 mm. The darkness of the local gray scale shows the magnitude of the induced magnetic field inside the plasma. The simulation was run with a plasma of fixed density at the core of the antenna and with a DC background magnetic field. The defined plasma density and magnetic field strength are representative of xenon plasma generated by the plasma production device/thruster described herein. FIG. 4B shows the magnitude of the induced coaxial magnetic field through the midpoint of the antenna (Z=7 mm). The greater the area under the curve, the more effective the antenna is at heating the plasma.

Figure 5A:
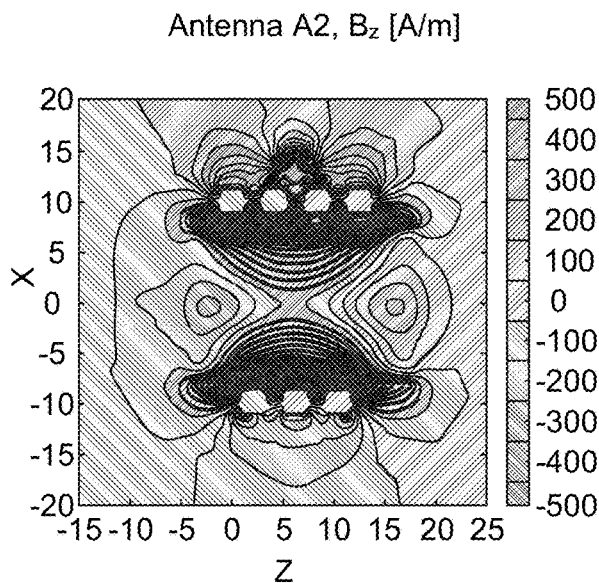
FIG. 5A is a 2D projection of CST-modeled axial induced magnetic fields inside a plasma as driven by the A2 antenna design described herein.
Figure 5B:
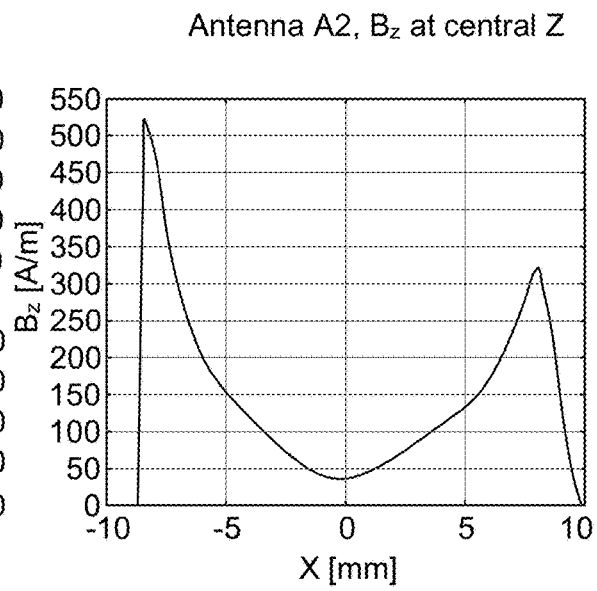
FIG. 5B is a cross-sectional illustration of the magnetic field strength versus radius (X̂) shown in FIG. 5A at Z=7 mm.

FIGS. 5A-B shows the results of a CST simulation using a different antenna geometry, designated antenna A2. Everything else about the simulation was the same as with the A6 antenna. The A2 antenna is a coiled antenna constructed from a flattened rectangular wire in which three turns are wound around the plasma liner from back to front circulating in a clockwise fashion. The A2 antenna is considered a "coil" as it consists of a single strap that wraps around the plasma liner in a circular, helical fashion. In a right-handed configuration, the antenna strap rotates in a clockwise fashion from the closed end of the liner to the open end. Likewise, in a left-handed configuration, the antenna strap rotates in a counter clockwise fashion from the closed end of the liner to the open end. At the beginning and end of the coil, two legs are attached that interface with the driving electrical circuit. The coil design does not consist of loops that are individually connected with straps, like the half helix. Instead, the entire antenna consists of a single connected spiraling strap that constitutes the main helical portion of the antenna. Thus, the current in the entire antenna at every point is traveling in such a fashion that the induced magnetic fields per Ampere's law in the center of the antenna always constructively interfere. In contrast, half helix designs, consisting of connected loops that circle the liner that are individually connected by straps, require the currents in the antenna to split into two halves as they circulate across the hoop. This configuration therefore causes the induced magnetic fields under the antenna to destructively interfere with each other, causing a reduction in the inductive heating efficacy and sub-optimal performance in miniature inductive RF thruster designs.

As with A6, the inner diameter of the antenna and the length were both 17 mm. The properties of the simulation are identical to that described in connection with antenna A6, except for the specific antenna geometry. FIG. 5A shows a cut plane through the antenna and its central axis (2). The straps of the antenna are represented by the approximately rectangular shapes at Y=±10 mm. FIG. 5B shows the magnitude of the induced coaxial magnetic field through the midpoint of the antenna (Z=7 mm).

As observed in the comparison of FIGS. 4A-B and 5A-B, antenna A2 is predicted to be significantly more effective than antenna A6 at inducing magnetic fields in the plasma, increasing the heating rate. The increased effectiveness results from the windings in A2 which are designed so that the induced magnetic fields from each strap interfere with each other constructively inside the plasma, locally increasing the magnitude of the induced fields in the plasma, increasing the penetration of the heating fields into the plasma liner. Conversely, the more traditional A6 design (e.g., see, reference 17; Chen et al.) induces fields in the plasma that destructively interfere with each other. As such, the A6 antenna style is severely sub-optimized for the skin depth heating mechanism described herein Example 2: Antenna Design Testing The two antenna designs (A2 and A6) were tested in identical plasma production devices by measuring the properties of the exhaust plume using a Langmuir probe, as described above. FIGS. 6A-D provide experimental evidence to confirm the CST simulation prediction of improved heating performance by antenna A2 relative to antenna A6. All operational and physical parameters were held constant for this comparison, except for the antenna geometry and the applied power sweep. The comparison was performed over a variety of powers to demonstrate the universality of this improvement.

Figure 6A:
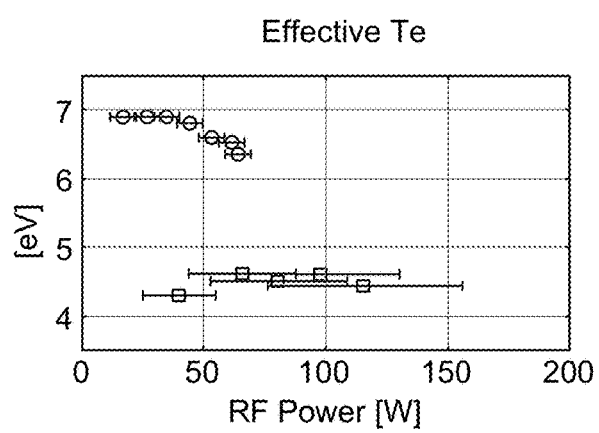
FIGS. 6A-D is a series of graphs showing the performance testing results of plasma production devices using antenna A2 (squares) and antenna A6 (circles) as measured in the exhaust plume by a Langmuir probe, each as a function of antenna RF power.
Figure 6B:
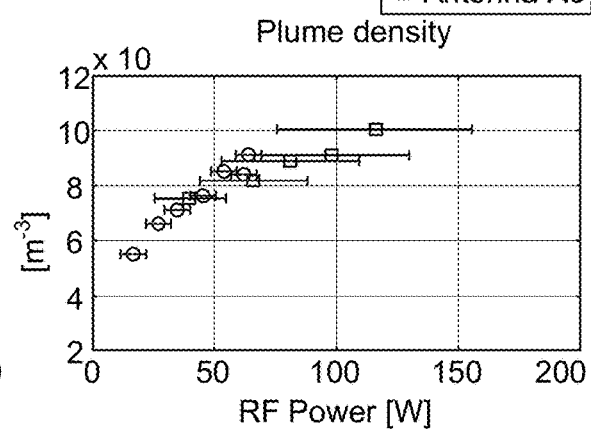
Figure 6C:
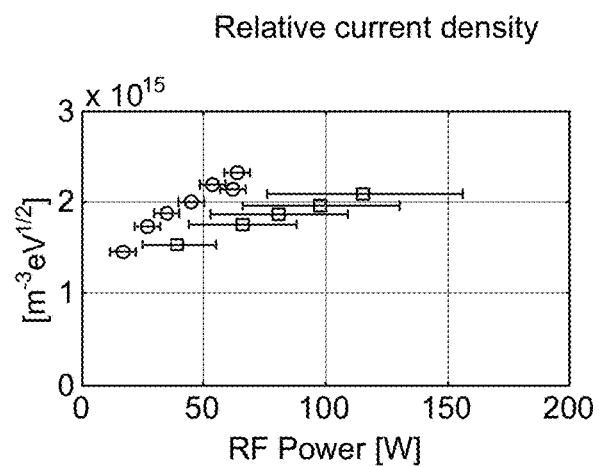
Figure 6D:
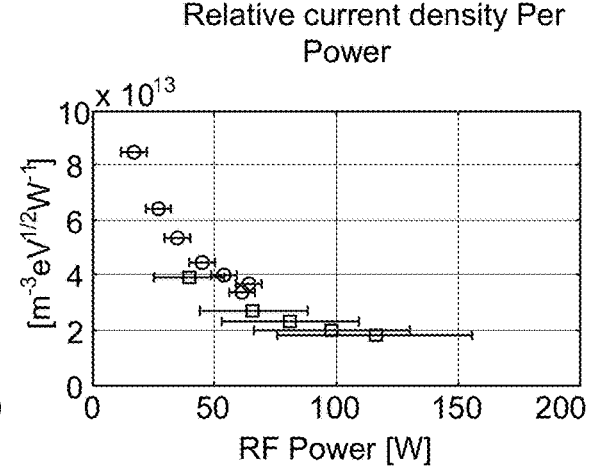

Specifically, FIGS. 6A-6D the measured effective electron temperature ($T_e$), plume density, relative change in plume current density, and relative change in plume current density per Watt of input power, respectively, for the plasma production devices using antennas A2 (squares) and A6 (circles). In thruster applications, plume current is proportional to the thrust out of the system. FIGS. 6A and 6B demonstrate that, while antenna A2 approximately ionizes the same fraction of the plasma (FIG. 6B), the plasma is significantly hotter using antenna A2 versus antenna A6 (FIG. 6A). Furthermore, FIGS. 6C and 6D demonstrate that, for a given Watt of input power into the antenna, the antenna A2 generates a significantly stronger plume current than antenna A6. Therefore, antenna A2 has significantly better plasma loading than antenna A6.

In order to further improve operational parameters, including plasma loading, a novel "flat spiral coil hybrid" antenna ("FSCH antenna") was designed. The FSCH antenna has a flat spiral portion and a coil portion in direct communication, contact, and connection. The "flat spiral" portion has a spiral configuration that expands in a radial direction from a central point but with no change/extension of the coils in a longitudinal direction. In other words, a "flat" spiral is planar. The coil portion may be a standard coil which refers to the shape formed when a coil travels in a helical pattern around a fixed axis in a longitudinal (axial) direction but does not increase in radial size. Thus, the FSCH antenna does not undergo a gradual transition in radius and axial position from the flat spiral portion to the coil portion. Instead, the FSCH has a definite transition point and connection between the flat spiral and coil portions. Generally, the common axis of the FSCH antenna is the central axis of the spiral portion and the longitudinal axis of the coil portion. In other words, the plane of the spiral portion is perpendicular to the longitudinal axis of the coil portion. In contrast FSCH antenna shape, the shape of another spiral (e.g., a three-dimensional spiral) changes simultaneously in radius and length as it wraps around a common axis, thereby creating a "beehive" shape.

The flat spiral portion is disposed against the closed end of the cylindrical plasma production chamber and the coil portion is wound around the cylindrical body of the chamber. Thus, the plane of the flat spiral is substantially perpendicular to the longitudinal axis of the plasma production chamber and the coil portion.

The flat spiral portion of the FSCH antenna is centered on the center point of the circular closed end of cylindrical plasma production chamber and spirally-extends towards the peripheral edge. The spiral portion may cover about 25%, 50%, 75%, or substantially 100% of the diameter (d) of the closed end.

The coil portion may begin anywhere along the length of the plasma production chamber but preferably begins as close to the closed end as practical. The coil portion extends towards the open end for any length or dimension. In some embodiments, the coil portion covers at least 25%, 50%, 75%, 80%, 85%, 90%, 95%, 99%, or substantially 100% of the length of the cylindrical plasma production chamber.

The spiral portion and the coil portion, independently, may be right-handed or left-handed. It is preferred that the spiral portion and the coil portion have the same direction (i.e., both are either right-handed or left-handed), although opposite directionality may be used.

RF Frequency Effects on Performance

When an electron is generated during a plasma-forming ionization event, the electron is exposed to the electric fields in the plasma ($\tilde{E}_0$) that are induced by the driven magnetic fields ($\tilde{B}_0$) from the antenna as described by Faraday's Law. The subsequent motion of these electrons before they make further collisions is given from Newton's equations as:

$$v_e(t) = v_e^o + \frac{e\tilde{E}_0}{2\pi m_e f}[\cos(2\pi ft) - 1] \quad (8)$$

where $v_e$ is the electron velocity, $v_e^o$ is the initial electron velocity, $m_e$ is the electron mass, $\tilde{E}_0$ is the amplitude of the fluctuating induced electric fields in the plasma, and f is the RF driving frequency. Equation 8 shows that the electron velocity in the plasma, exposed to the induced electric fields, is a strong function of its initial velocity, the driving frequency, and the amplitude of the fluctuating electric fields. Electrons in the plasma that are accelerated to sufficiently high speeds before they collide with a neutral propellant atom, will ionize the propellant upon this impact. The probability of this ionization event is a strong function of the speed of the electron relative to the neutral atom, and generally exhibits a peak. For example, xenon gas is most effectively ionized by electrons with kinetic energies ranging between 40 and 60 eV.[18] Thus, for a given value of $v_e^o$, $\tilde{E}_0$ and f, an electron in the plasma liner (plasma production chamber) can become "trapped" in an energy range that is optimal for ionization of the background gas.

Figure 7A:
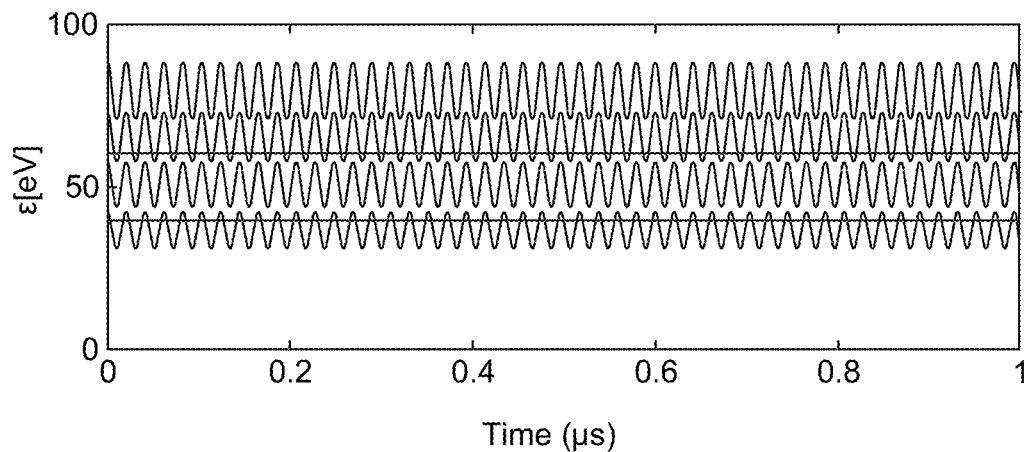
FIG. 7A is a graph demonstrating the kinetic energy fluctuation of an electron as a function of initial electron velocity/kinetic energy.
Figure 7B:
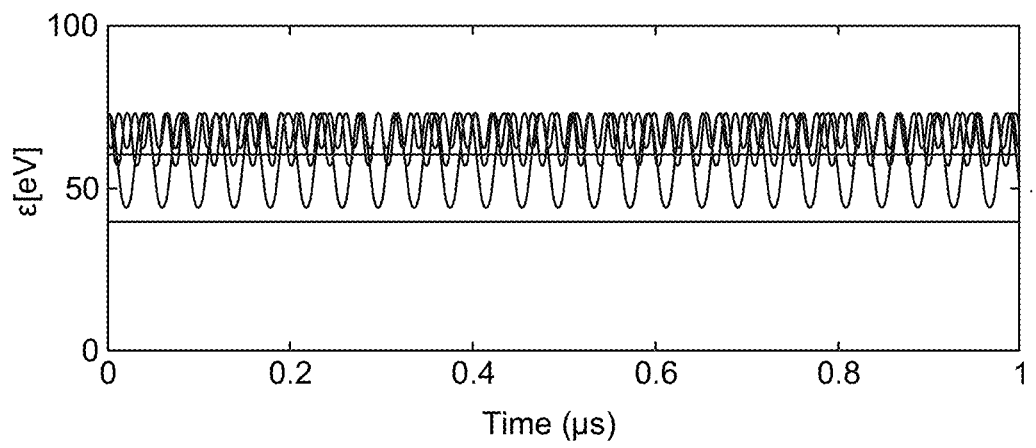
FIG. 7B is a graph demonstrating the kinetic energy fluctuation of an electron for different RF driving frequencies. The area between the dark horizontal lines corresponds to the optimum energy range of an electron to ionize a neutral xenon atom (40-60 eV).

FIGS. 7A-7B describe this "phase space trapping" effect. In both panels, the x-axes show a time sequence in μs, and the y-axes show units of electron energy in eV. The dark horizontal lines demarcate a region of energy (40-60 eV) where the neutral xenon gas is most efficiently ionized by electrons with those of kinetic energies. The black curved lines in FIG. 7A represent the changes in electron energy over time due to the presence of the oscillating induced electric field, $\tilde{E}_0$, for four different starting electron velocities, $v_e^o$, which correspond to electron starting kinetic energies described by $$\epsilon_0 = 0.5 m_e v_e^{o2} \quad (9)$$

Likewise, in FIG. 7B the black tracks represent changes in electron kinetic energy over time due to the oscillating fields, with different field oscillation frequencies, f. The more time a given electron spends in the band of likely ionization (40-60 eV), the more frequently ionization events occur until the plasma in the plasma liner is fully ionized. Therefore, the total integrated time an electron spends between the 40 and 60 eV lines in FIGS. 7A-7B is proportional to the rate of ionization within the plasma liner. This relationship demonstrates that the frequency and power of the RF waves launched by the antenna thereby have a direct impact on the plume density and performance in thruster applications.

Figure 8:
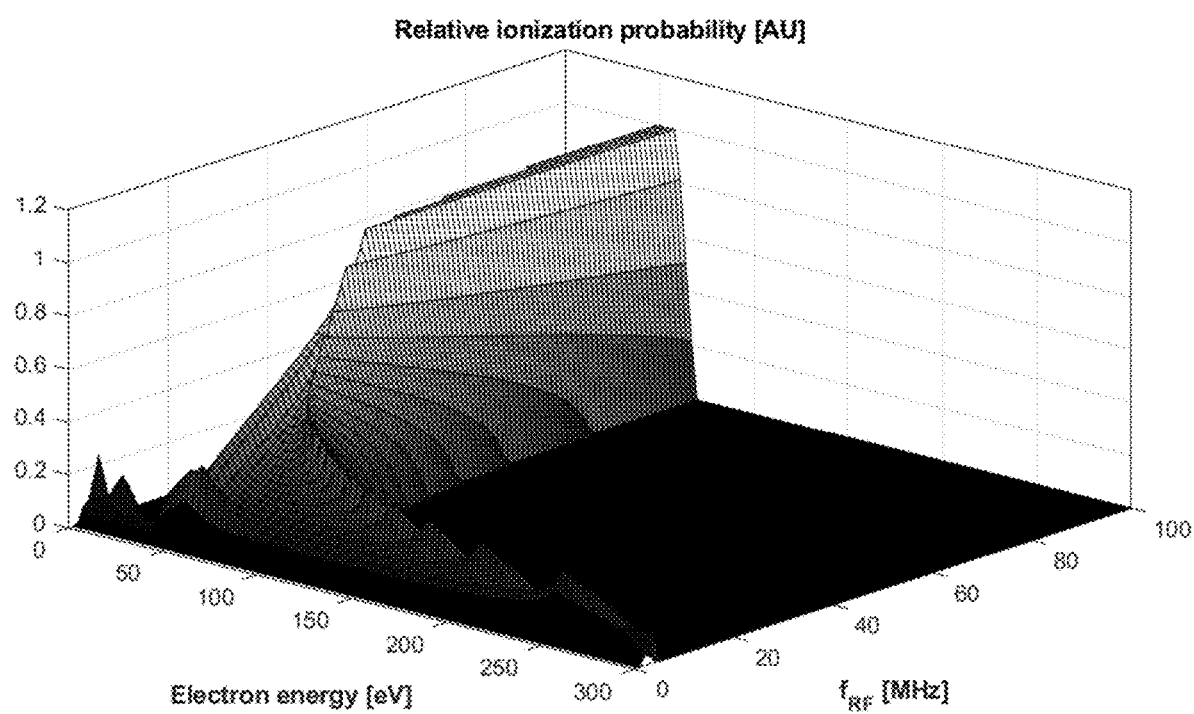
FIG. 8 is a three-dimensional graph showing the relative likelihood of neutral propellant gas ionization as a function of initial electron kinetic energy and RF frequency.

FIG. 8 describes this frequency effect. The x-axis and y-axis show the initial electron energy and RF frequency, respectively. The z-axis illustrates the relative likelihood of the electron ionizing the neutral xenon gas. The specific shape of this probability curve is a function of the antenna geometry. FIG. 8 shows that for a fixed antenna geometry, the probability of ionization strongly depends upon the RF frequency and the initial electron kinetic energy. Thus, the RF frequency can be optimized and fixed combination of (i) a specific antenna geometry, (ii) input power, and (iii) propellant flow rate to optimize the ionization efficiency of the neutral propellant gas without significantly altering other system variables which may be limited or preset for other design considerations and aspects.

From this, it can be seen that the frequency of the applied RF (f) is bounded for optimum propellant ionization. Specifically, f must be high enough to maximize propellant ionization but must be less than about 25% (e.g., less than about 20%, 15%, 10%, or 5%) of the electron cyclotron frequency ($f_{ce}$), in radians per second, as described by:

$$f_{ce} = \frac{eB_0}{m_e} \quad (10)$$

wherein $B_o$ is the axial magnetic DC field strength in the plasma liner (plasma production chamber) and $m_e$ is the mass of an electron. For example, for an axial magnetic field strength of 500 Gauss (0.05 Tesla), 25% of $f_{ce}$ is 350 MHz. Thus, the RF frequency (f) should be kept to less than 350 MHz in this example. At these upper bounds, the dominant energy transfer mechanism between the antenna and the plasma becomes the "electron cyclotron resonance," which has been extensively documented in plasma physics literature. The miniaturized inductive plasma source described herein is not designed around this optimization, keeping the cyclotron resonance as the upper bound for this source's operational frequency. As discussed elsewhere, the RF frequency is preferably maintained above 3 MHz (e.g., in the HF or VHF range).

Integrated Plasma Production Device and Thruster Design

The thruster design described herein provides several advantages over existing electric propulsion systems. First, as mentioned previously, RF switching electronics have steadily decreased in size and cost, and have increased in power density due to advances with cellular and wireless power technologies. This allows the power processing unit for the thruster to be less than 500 grams for low Earth orbit CubeSat applications. Second, the unique small size of the system allows the volumetric RF power density in the plasma liner to be extremely high. For example, for a typical 100 W operation of the present thruster design, the steady state volumetric RF power density inside the liner is on the order of $10^7$ W/m$^3$, as measured by the operational power into the thruster divided by the plasma liner volume. Contrast this to a typical volumetric power density of a laboratory helicon and helicon thruster, which range between $10^5$-$10^6$ W/m$^3$ at steady state, estimated in the same manner. Third, the present thruster design does not need to rely on resonant energy transfer mechanisms between the RF signal and the plasma. Stochastic heating of the electrons in the near field of the antenna is sufficient to generate large populations of fast particles. Also, the RF signals in the present thruster design are in the HF to VHF band. Compared to similar electron cyclotron resonance (ECR) thrusters which operate in the S band and at higher frequencies, the RF signal generated in the present design has significantly less perturbation on common spacecraft communication signals. Fourth, the inventive thruster designs are easily manufactured and may be constructed using conventional parts and components, and simple machining and assembly techniques. Thus, the inventive thrusters are low-cost, mass-producible, and scalable in size and volume for application is a wide variety of satellite types and missions.

Figure 12A:
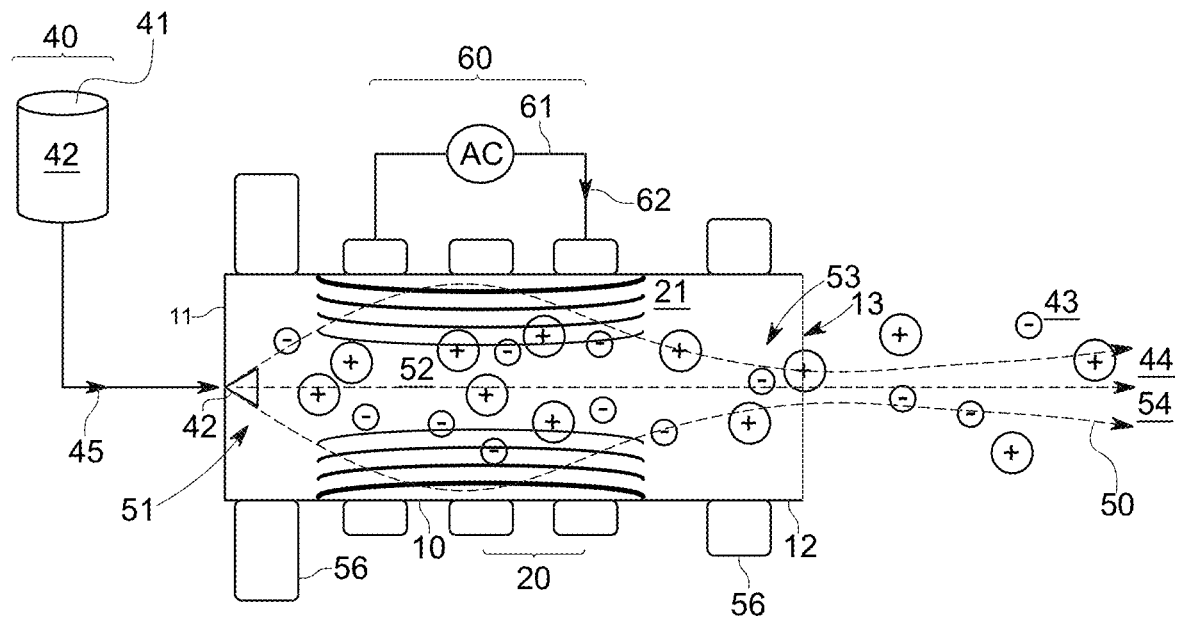
FIG. 12A is a schematic diagram of an integrated thruster design, in cross-section, that embodies the principles described herein.
Figure 12B:
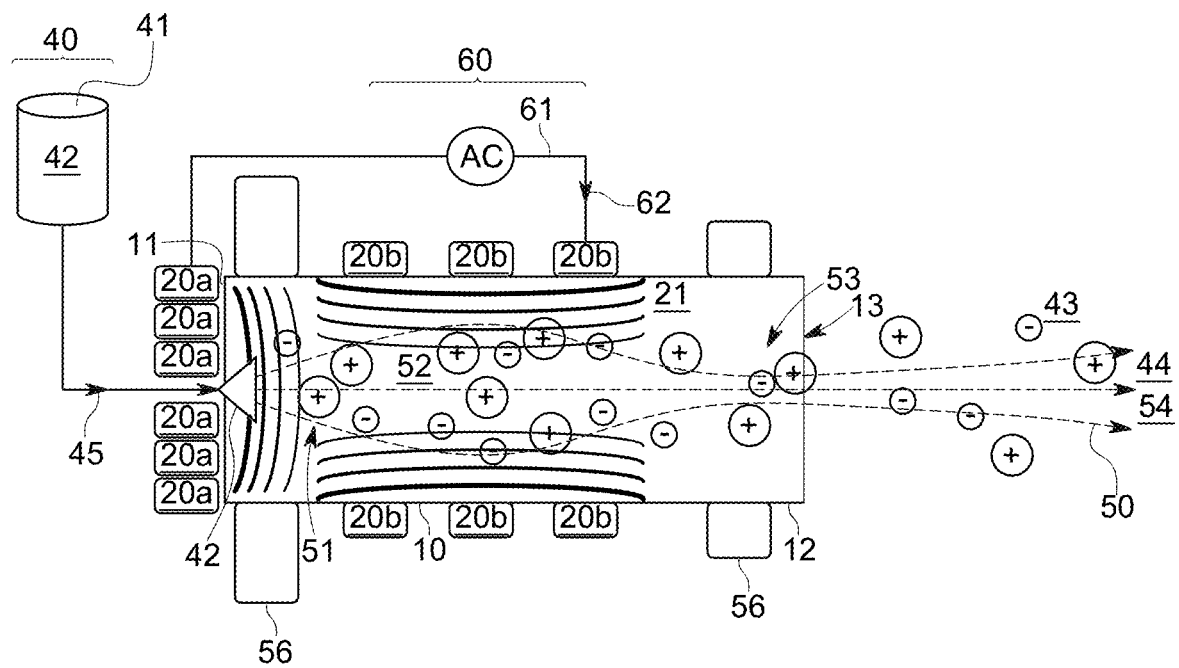
FIG. 12B is a schematic diagram of an integrated thruster design, in cross-section, having a flat spiral coil hybrid antenna.

Based on the foregoing simulations and experimental results, an integrated thruster design was developed and illustrated in FIGS. 12A-12B. The thruster 100 has a cylindrical plasma liner 10 having a closed end 11 and an open end 12. In some embodiments, plasma liner 10 has a diameter of about 1-5 cm. In some embodiments, plasma liner 10 has a length, from closed end 11 to open end 12, of about 5-10 cm.

A propellant delivery system 40 is located external to plasma liner 10 and has at least a propellant tank 41 configured to deliver a flow of gaseous propellant 42 to the interior of plasma liner 10. Propellant tank 41 serves as a reservoir for pressurized propellant 42. Optionally, propellant delivery system 40 also comprises flow regulator 45 configured to meter the flow of propellant 42 into plasma liner 10. In some embodiments, propellant 42 is delivered to the interior of plasma liner 10 at a rate of about 0.01-5.0 mg/s.

Antenna 20 is configured to deliver an RF field 21 to the interior of plasma liner 10. As shown in FIG. 12A, antenna 20 may be a coiled antenna (e.g., A2), a half-helix (e.g., A6), helical, or in any other suitable configuration sufficient to cause ionization of propellant 42 into plasma 13 when propellant 42 is exposed to RF field 21 under appropriate power conditions as described herein. Antenna 20 may be fashioned from silver or related alloys, gold or related alloys, aluminum, stainless steel, steel, copper, bronze, graphite, tungsten, or possibly any rigid and electrically conducting material, or any other suitable material for this purpose. In some embodiments, antenna 20 is fashioned from a flattened rectangular or square wire, a transmission line, a vapor-deposited material on an insulating substrate, or any other rigid and electrically conducting material processing technique. In some embodiments, antenna 20 comprises a coil, half-helix, or helical portion having 1-20 turns (e.g., 1-15, 1-11, 1-9, 1-7, 1-5, 1-3, 1-2, 2-15, 2-11, 2-9, 2-7, 2-5, 2-3, 3-15, 3-11, 3-9, 3-7, 3-5, 4-15, 4-11, 4-9, or 4-7 turns) in a clockwise or counter clockwise fashion, with electric and mechanical interfaces to feed the antenna with current and to mechanically mater the antenna to the thruster around the external surface of plasma liner 10. In some instances, the electric and mechanical interfaces may be the same feature. In some embodiments, antenna 20 is in direct contact with the external surface of plasma liner 10.

FIG. 12B illustrates an integrated thruster design having a flat spiral, flat spiral-coil hybrid ("FSCH") antenna 20. In this case, the FSCH antenna 20 has a flat spiral portion 20a that is disposed against the exterior surface of the closed end 11, and coil portion 20b wrapped around the cylindrical body of plasma liner 10 in the direction of open end 12. The coil portion may have similar or the same characteristics as described above for antenna lacking the flat spiral portion.

Antenna 20 is powered by power control system 60 which may comprise battery 61 and, optionally, inverter 62. In some embodiments, power control system 60 provides DC current which is converted to AC current by inverter 62 prior to delivery to antenna 20. In some embodiments, power control system 60 provides DC current which is converted to a small AC current by inverter 62 and is then amplified to a large AC current prior to delivery to the antenna 20 by a power amplifier. A frequency modulator or "clock" is used to define the frequency of oscillation of the AC current. In some embodiments, passive electrical circuitry (e.g., a matching network) may be placed between the driver circuit and the antenna.

Figure 12C:
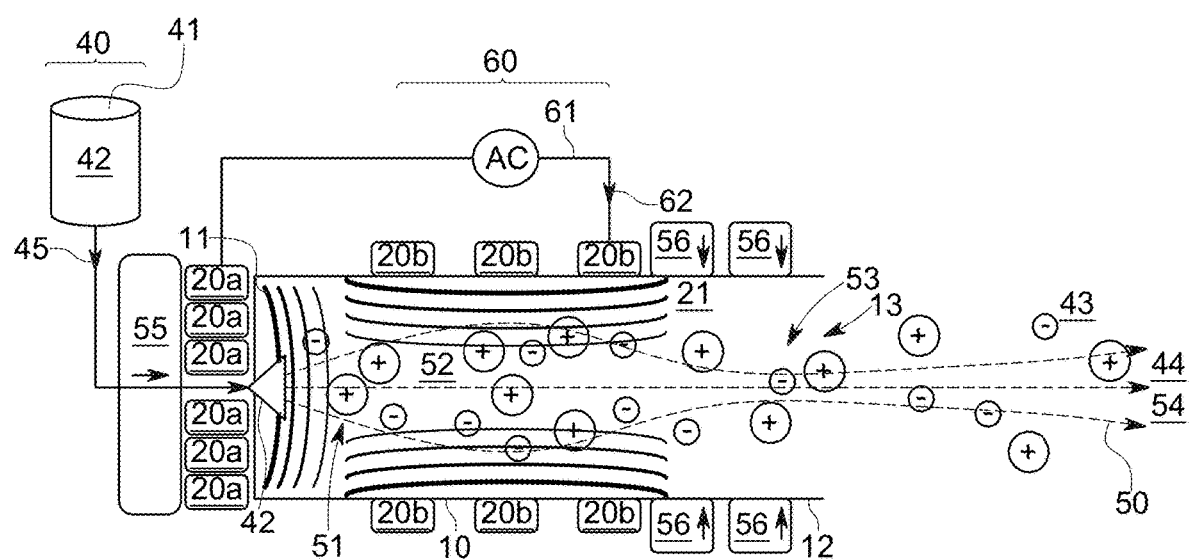
FIG. 12C is a schematic diagram of an integrated thruster design, in cross-section, having both a flat spiral coil hybrid antenna and a magnet system comprising a planar magnet and radially-disposed magnets.

Thruster 100 also has a magnet system 30 having radially-disposed magnets 31 about plasma liner 10 such that each magnet produces a magnetic field 50 of the same polarity (either positive or negative) within plasma liner 10. As shown in FIG. 12C, magnet system 30 may also have a planar magnet 55 in combination with radially-disposed magnet(s) 56. The arrows in magnets 55 and 56 indicate the direction of polarization. In some embodiments, the radially disposed magnets are held a fixed distance axially with the planar magnet. All magnets are coaxially aligned relative to the plasma liner axis. The radial magnet is held at an axial distance no greater than the length of twice the liner away from the planar magnet. The planar magnet ranges in diameter between 0.5 cm and 4 cm, and in thickness between 0.1 cm and 3 cm. In some embodiments the radial magnet or magnets are magnetically polarized in the radial direction (positive or negative). In some embodiments the radially disposed magnets are magnetically polarized in the positive or negative axial direction. In some embodiments the radially disposed magnet is polarized at an angle in between purely radial and purely axial. In some embodiments there are multiple radially disposed magnets, with varying magnetic polarization directions. The location and strength of the minimum axial magnetic field strength generated by this sequence of magnets on the axis of the plasma liner describes the position and size of the region of maximum ion Larmor orbit radii. At this location the plasma liner radius needs to be no larger than 5 Larmor orbit radii to maintain sufficiently high volumetric power density inside the plasma. This condition is always held in place by the upper bound on the plasma liner radius defined by the plasma skin depth, as defined in Equations 5a through 5c.

In some embodiments, magnet system 30 forms within plasma liner 10 a magnetic field 50 characterized as having a first throat section 51 towards the closed end 11 of plasma liner 10, a plasma containment region 52 approximately centrally-located within plasma liner 10, a second throat section 53 toward the open end 12 of plasma liner 10, and a diverging section 54 approximately at opening 13 of plasma liner 10 and extending away from opening 13. The first throat section 51 and second throat section 53 are characterized as having a relatively high magnetic field strength, and plasma containment section 52 and diverging section 54 are characterized as having a relatively low magnetic field strength. The magnetic field strength of first throat section 51 and second throat section 53 need not be the same and depend upon the strength and configuration of the local magnets. Diverging section 54 and opening 13 together form a nozzle through which plasma ions pass from the interior of plasma liner 10 to the exterior, thereby generating thrust.

In operation, neutral propellant 42 is delivered to the interior of plasma liner 10 where it is ionized by RF fields 21 generated by antenna 20. Neutral propellant 42 is ionized into electrons 43 and positively-charged propellant ions 44. Electrons 43 and ions 44 are further heated by RF fields 21. Magnetic field 50 generally serves to prevent plasma ions from impacting the interior surfaces of plasma liner 10. However, it is understood that ions of sufficiently high energy still may impact plasma liner 10, thereby reducing thruster efficiency and eroding those interior surfaces. First throat section 51 has a relatively high magnetic field strength relative to plasma containment section 52 which serves both to protect closed end 11 and associated structures from plasma corrosion and to slow and reverse plasma ions (esp. electrons 43) back into the body of plasma containment section 52, thereby increasing the ionization efficiency. Likewise, second throat section 53 has a relatively high magnetic field strength relative to plasma containment section 52 which serves to regulate the outflow of plasma ions (electrons 43 and positive ions 44) from the plasma liner. Electrons that are repelled by second throat section 53 return to plasma containment section 52, thereby increasing ionization efficiency. The "electron rebound effect" caused by the throat sections 51, 53 serve to increase the apparent length of plasma liner 10 by increasing the electron residence time within the plasma liner 10 and concomitantly increasing the time for which that electron is available to participate in an ionization event. It is understood that improved ionization efficiency comes at the expense of thrust moment. The balance between ionization efficiency and thrust moment may be regulated by the magnetic field strength of second throat section 53.

Figure 13A:
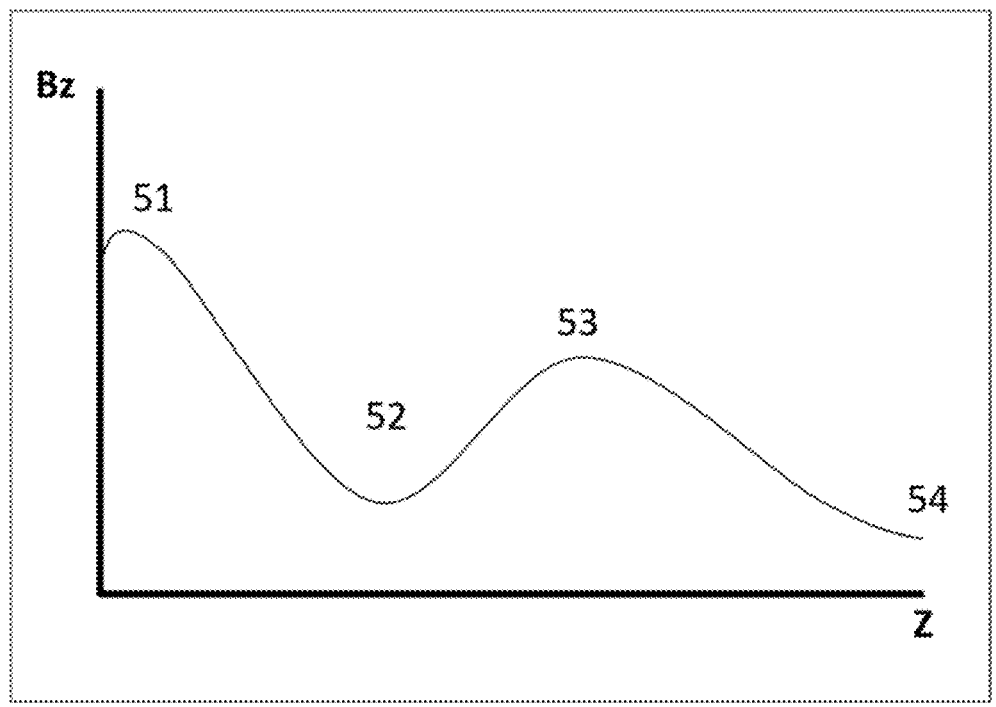
FIG. 13A is a graph showing one configuration of magnetic field strength across the longitudinal length of the plasma liner described in FIGS. 12A-C in which the magnetic field strength increases toward the open end of the plasma liner/plasma production chamber, thereby forming a defined "throat" section 53, before decreasing towards and through the open end.
Figure 13B:
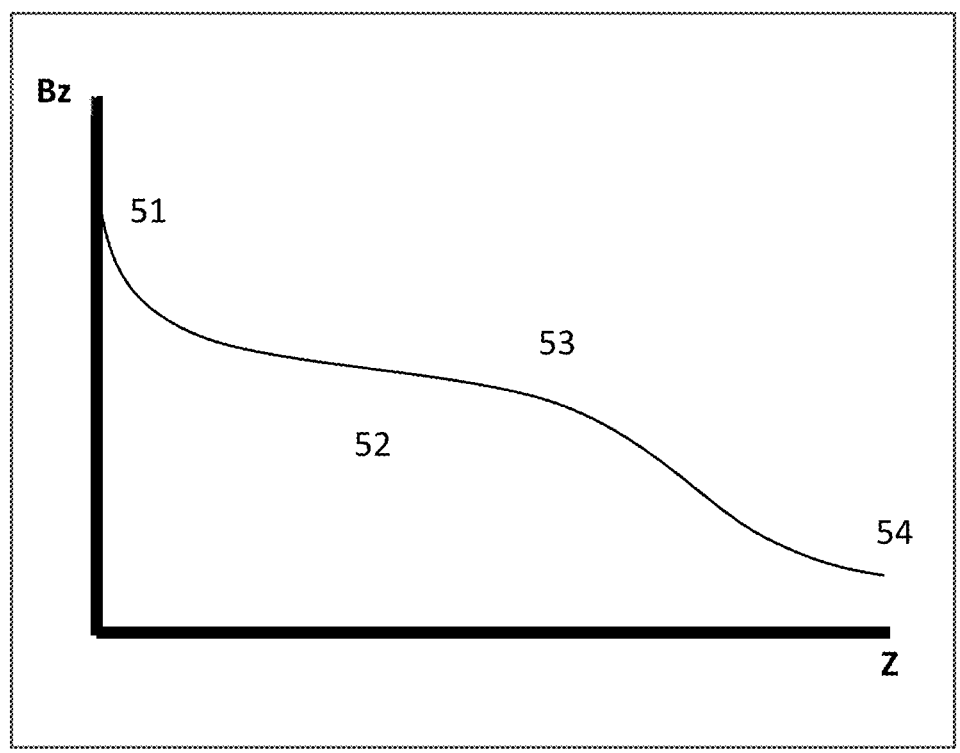
FIG. 13B is a graph showing another configuration of magnetic field strength across the longitudinal length of the plasma liner described in FIGS. 12A-C in which the magnetic field strength is continuously decreasing (or at least does not increase) from the closed end to the open end. Throat section 53 represents a reduction in the rate of change (reduction) in the magnetic field strength along the longitudinal axis from the closed end to the open end.

FIGS. 13A-B are graphs showing the characteristic field strength (Bz) of magnetic field 30 as a function of the length (Z) of plasma liner 10 in two different configurations. FIG. 13A illustrates a relatively high magnetic field strengths at first throat section 51 and second throat section 53. The high field strength at the first throat section 51 corresponds to the closed end of plasma liner 10 and serves to repel plasma ions from the closed end back into the body of the plasma liner 10, thereby reducing erosion of the closed end and reducing the loss of generated plasma. In some embodiments, the magnetic field strength at second throat section 53 is less than or is equal to the magnetic field strength at first throat section 51 but greater than the field strength in the plasma liner 10 body, indicated body section 52. Plasma generation efficiency is increased by increasing the relative difference in the magnetic field strength between body section 52 and second throat section 53. A larger "magnetic hill" between sections 52 and 53 serves to rebound more ions and electrons into body section 52, increasing the probability of neutral propellant ionization. FIG. 13B illustrates another magnetic field configuration in which the field strength at "throat" section 53 is equal to or less than the field strength in body section 52. In this embodiment, the magnetic field strength is solely diverging in the proximal (closed end) to distal (open end) direction. As illustrated in FIG. 13B, the magnetic field strength may not decrease linearly or otherwise proportionally over the liner length, although it may. For example, the magnetic field strength in section 53 may be the same as, or only slightly less than, the minimum field strength in section 52, and then decrease at a higher rate towards and beyond the open end. In these cases, the magnetic nozzle is described as monotonically decreasing, or solely diverging, in axial strength from the closed end of the plasma liner to the open end of the plasma liner. Depending on the power and size of the plasma liner, the configuration in FIG. 13A or in FIG. 13B may provide improved thrust and specific impulse.

Example 3—Plume Investigations

Experimental Design

The measurements presented here were performed using the test unit described above with antenna A2 in a vacuum chamber system having a diameter of 0.75 m and a length of 1.25 m. The chamber was pumped by a Seiko Seiki maglev and an Alcatel ceramic bearing turbomolecular pump, which themselves were backed by an Alcatel and Edwards roughing pump respectively, with 28 l/s of total roughing capacity. The total pumping speed observed by the system was 2,400 l/s on $N_2$. The system typically achieved a pressure of $2 \times 10^{-7}$ Torr within one hour of pumping and achieved $9 \times 10^{-8}$ Torr after three hours of pumping. Typical base pressures for the measurements presented here were between these two values. All high vacuum pressure measurements were made by a nude hot filament ion gauge inside the system. Foreline pressures on the turbomolecular pumps were also actively monitored with thermocouple gauges.

FIG. 9 shows a schematic showing the set-up and the probe diagnostics configuration in the small vacuum chamber. The thruster unit is fixed coaxially with the chamber near the door, and fires down the length of the chamber. Power and xenon gas are fed to the thruster through vacuum feed-throughs. Mass flow is controlled down to ±0.01 mg/s in the thruster by the same Alicat mass flow controller used for calibrating the test bus mass flow rate.

The Faraday probe was designed following an elongated "nude" design.[19] The probe was comprised of a 1 cm diameter tungsten collection plate separated by a stainless steel 1.5 cm long guard ring. The collection plate was held in place with a boron nitride ceramic insulator between the collector's electrical connection and the guard ring. The ceramic insulator was recessed from the surface of the collector plate and the plasma-facing edge of the guard ring. The collector and guard ring were held at the height of the thruster on an alumina stalk, which itself was held in a stainless steel base. The alumina stalk and stainless steel base were hollow, with interior dimensions that allowed for a shielded electrical connection between the collector plate surface and an SMA output on the base. Also inside this region, were a series of self-resonant inductive chokes, set at specific frequencies. This allowed the probe stalk to be used for both Faraday probe and swept Langmuir probe measurements. The SMA output of the Faraday probe/Langmuir probe stalk allowed the signal to be sent to an SMA feed through in the vacuum chamber via a shielded coaxial cable. On the outside of the chamber the probe was biased, and the current collected was measured by a Keithley 2400 source meter. Again, the same setup was also used for swept Langmuir probe measurements. The Keithley source meter was controlled and read using a LabView-based data acquisition (DAQ) system on a dedicated control rack for the small vacuum chamber.

The probe holder and stalk were mounted on the end of a radial arm, which itself was mounted to a ThorLabs rotational mount. The center of the mount was aligned with the vertical axis in the chamber that intersects the center of the thruster orifice, and was parallel to the thruster orifice exit plane. Adjusting the angular position of the rotational mount adjusted the position of the probe along a circular arc facing the thruster exit orifice. For the measurements presented here, the probe was always 16.5 cm radially away from the center of the thruster orifice. Care was taken to align the collecting surface of the Faraday probe to be normal to the vector intersecting the center of the thruster orifice and the center of the probe collector surface. The rotational mount angular position was controlled with precision of ±0.25 deg.

The angular acceleration and the angular velocity of the rotation stage were also controlled. For the measurements presented here, varying angular velocities between 0.5 and 4 deg/s were implemented. The position and the rotational parameters of the mount were also all controlled through the DAQ computer remotely.

Finally, a USB powered camera was placed inside the chamber, monitoring the thruster, plume and the probe position at all times. The camera was not designed for in vacuum use, and as it heated up the CCD image became increasingly noisy. This required brief camera cool down periods between runs.

All Faraday probe measurements were performed at −164 V bias on the Faraday probe. Swept Langmuir probe measurements extended between −63 V and +63 V. All voltages were measured relative to the vacuum chamber wall, which was defined as the system ground. All electronics, including the entire DAQ rack were referenced to this potential.

Results

Figure 10A:
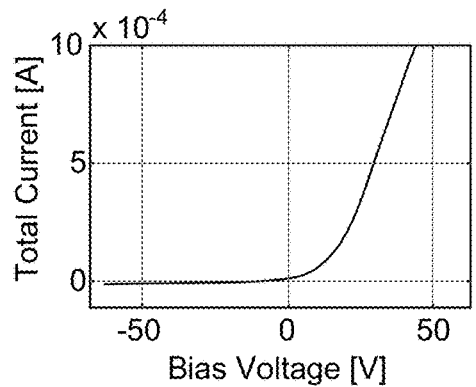
FIGS. 10A-D is a series of Langmuir probe traces in the plume of the RFT Development Unit at a propellant mass flow rate of 0.3 mg/s and 20 W.
Figure 10B:
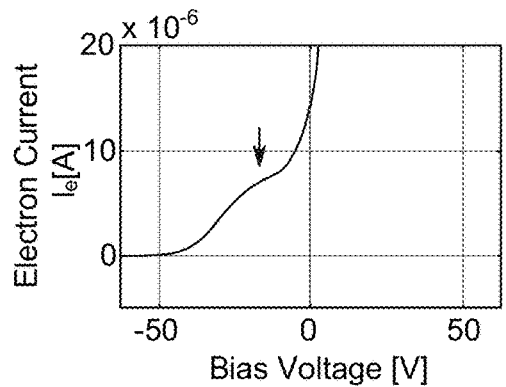
Figure 10C:
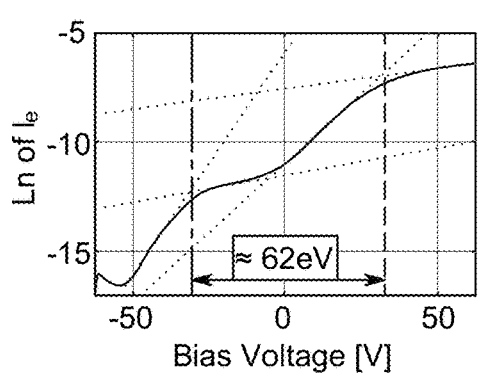
Figure 10D:
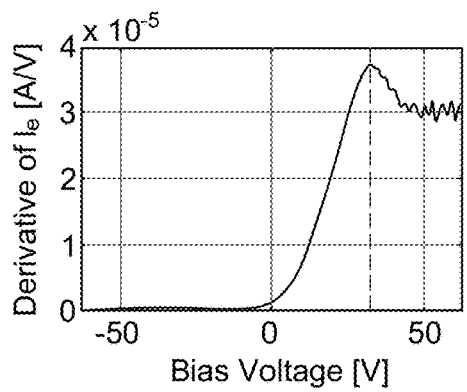

Plume measurements exhibited significant beam and fast electron signatures in the Langmuir probe traces. FIGS. 10A-D show a characteristic trace from the demonstration thruster showing a fast electron beam. FIG. 10A shows the overall Langmuir probe trace, and FIG. 10B shows a zoomed in view after the ion contributions are subtracted. The downward arrow points to a classic signature of a fast electron beam on top of a thermal background. FIG. 10C shows the natural logarithm of the electron current trace. This allows the features at low current levels to be highlighted and analyzed. To distinguish between hot electrons and a fast monoenergetic electron beam, one looks for an electron population in the trace that is so hot that fitting to it yields temperature usually greater than 30-40 eV (V=−30 to −20 V in FIG. 10C), which quickly dies off to zero current at a sufficiently negative bias voltage. Assuming the feature marked by the downward arrow in FIG. 10B is in fact an electron beam, an estimate of the probe bias required to fully repel the beam is provided by the intersection of the dotted and dash-dotted lines (~32 V). Similarly, the transition of the collected probe current to electron saturation—the bias voltage at which all electrons in the distribution are collected—is marked by the intersection of the dotted and dashed lines (~31 V). This feature is also highlighted in the first derivative of the probe trace, shown in FIG. 10D, where the peak of the first derivative marks the transition to electron saturation.

In quiescent plasmas (plasmas with no RF fluctuations, and a single species of thermalized electrons and ions), this transition approximates the local plasma potential. In the measured plume plasma, where RF fluctuations, beams, secondary emission, and multiple populations all may be present, the transition to electron saturation is at best an approximation of the plasma potential within an uncertainty of $T_e$/e, where $T_e$ is the electron temperature in units of eV, and e is the fundamental charge.

The bulk electron temperature was measured to be ~5 eV, which was calculated from the inverse slope of the fitting line to the natural log of the electron current after the beam electrons were subtracted. The local plasma potential, as sensed by the Langmuir probe, was estimated to be 31±5 V. The same uncertainty was applied to the measured bias voltage to repel the electron beam. Therefore, the electron beam kinetic energy relative to the estimated local electric potential (the kinetic energy of the drifting fast electrons, not the temperature of the fast population) is ~62±10 eV. Such electron beams are expected in expanding RF plasmas and have been observed with similar energies in low density RF plasmas.[20,21]

Other features in the electron distribution may manifest themselves similarly in Langmuir probe traces, such as RF local electric potential fluctuations and secondary emission. RF fluctuations should be significantly damped in our probe traces through the RF chokes in the probe circuit. Also, RF fluctuations impact the entire electron distribution, so the fluctuating beam-like signal should be seen at current levels comparable to the electron saturation level, which is not observed here. Secondary emission has the characteristic tell tale of a non-monotonically decreasing electron current collected as the bias voltages decreases, which is also not observed here. Therefore, treating the signature presented in FIG. 10 as a beam indicates that 16.5 cm away from thruster nozzle, at mass flow rates of 0.3 mg/s, very high energy electron beams are present, indicating that the inductive and stochastic heating in the thruster is sufficient both for high ionization rates of xenon gas by electron impact as well as fast electron ejection driving ion ambipolar acceleration.

Figure 11:
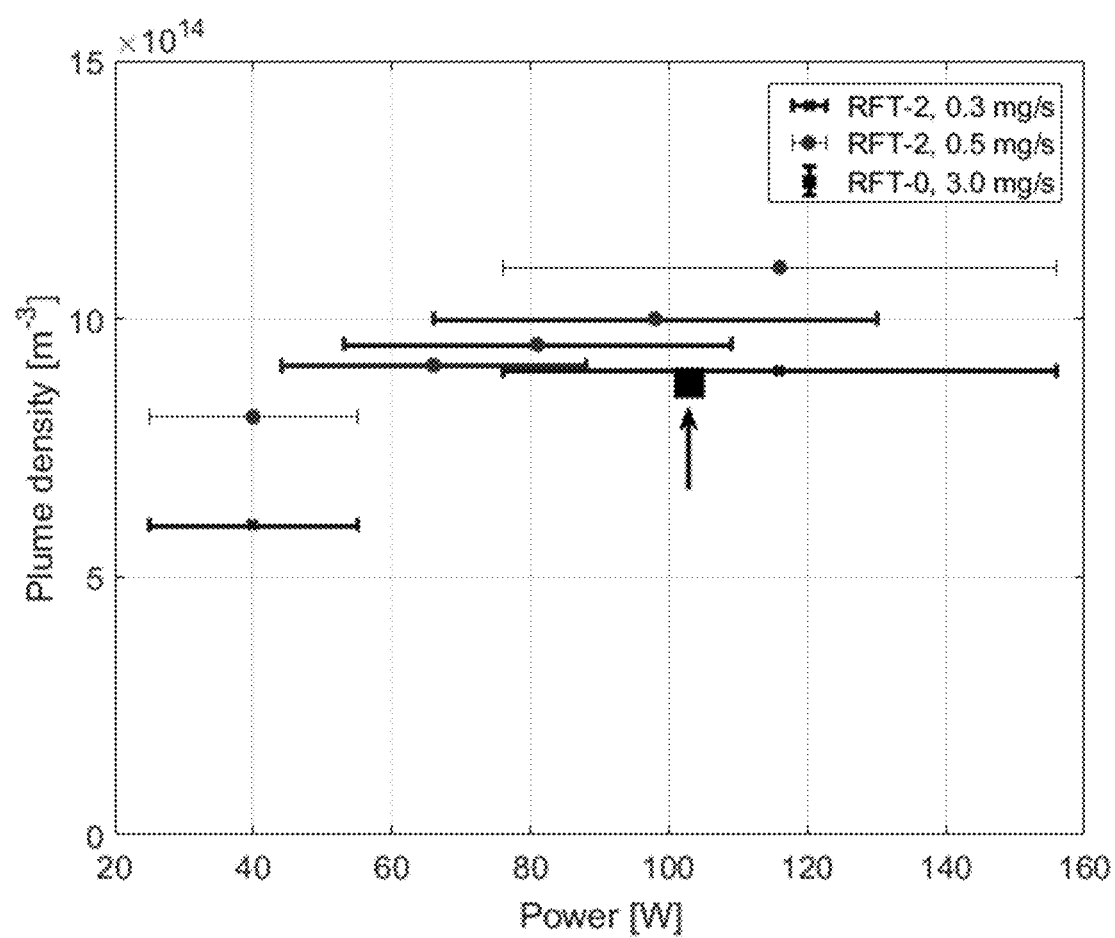
FIG. 11 is a scatter plot showing the plasma density in the plume of the development unit described herein at propellant mass flow rates of 0.3 and 0.5 mg/s as a function of applied power. The black square shows the fiducial data point for an unoptimized earlier generation prototype at a propellant mass flow rate of 3 mg/s.

The plasma density in the plume also was measured and summarized in FIG. 11. The wide error bars in applied power resulted from the very coarse method of power measurement for the initial tests of the development unit. Also shown in FIG. 11 is the density measured in the plume of an earlier generation (unoptimized) development unit, at 3 mg/s. The salient aspect is that this development unit operating at up to 10 times lower mass flow rates and was able to generate plume densities comparable to that earlier generation unit. This, along with the observed presence of fast beam electrons, indicated that the present unit is ionizing significantly more propellant than the earlier unit and was successfully accelerating the plasma out of the thruster (plasma production chamber) at high speeds. These data suggest that the present development unit achieving higher propellant utilization efficiency and specific impulse relative to earlier prototypes and existing thruster designs.

Example 4—Experimental Thrust Measurements

Experimental Design

Direct thrust measurements were determined for a test unit as described above except having an FSCH antenna, as described above. The FSCH antenna was right-handed. The coil portion had 11 turns wrapped around the liner, and the flat spiral section had 5 turns expanding outward from the central axis of the liner back plane. Xenon was used as the gaseous propellant and delivered to the plasma production chamber (plasma liner) at 0.5 mg/s. Electrical power of 40 W to 125 W was applied to the thruster using laboratory RF power equipment. The thruster was commanded using laboratory control software. Power was measured using in-line forward and reflected power meters between the RF power source and the thruster.

Thrust measurements were obtained in a vacuum chamber that is 3.7 m long and 2.4 m in diameter. The chamber had a baseline pressure of approximately $10^{-8}$ Torr and was pumped by a 30,000 l/s cryogenic pump. A torsional pendulum thrust stand inside the vacuum chamber was used to directly measure the generated thrust. The thrust stand has been previously described.[26-27]

Results

Figures 14, 14A:
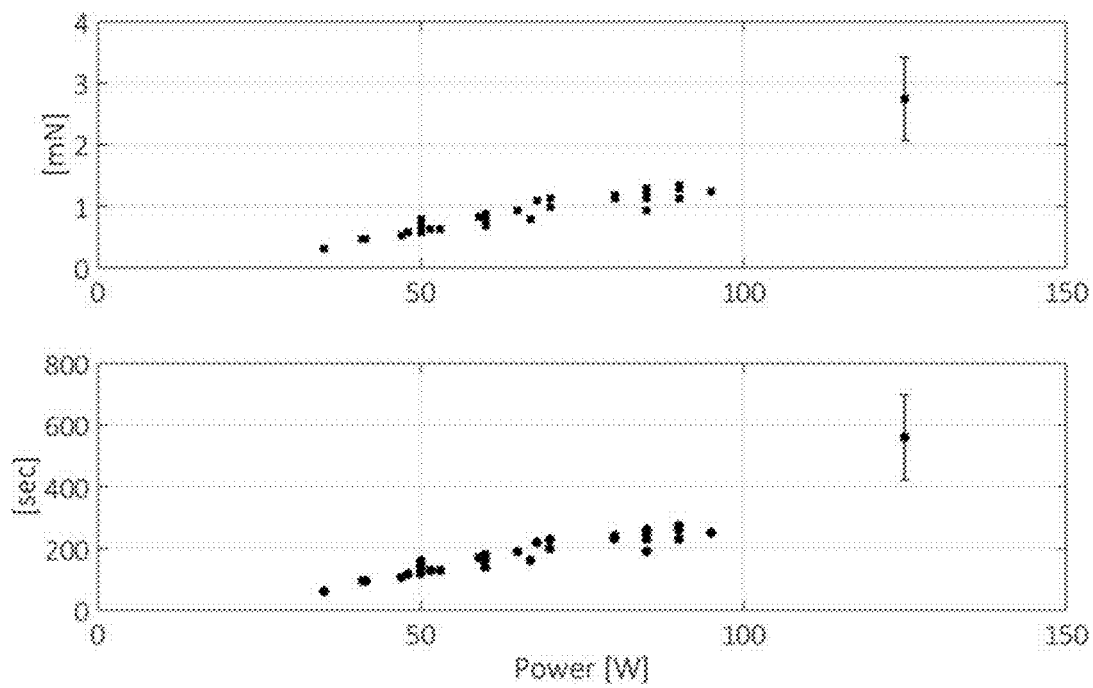
FIG. 14A is a scatter plot showing the measured thrust produced by the FSCH-RFT integrated thruster design described herein.

FIGS. 14A-B describe the initial performance testing of the FSCH-RFT developmental unit. FIG. 14A shows the thrust produced by the FSCH-RFT unit as a function of input power. The increase in thrust as a function of power is typical of electric propulsion devices. However, the present design significantly greater thrust at low power (40 W to 125 W) and low propellant flow rates (0.5 mg/s xenon) compared to existing electrode-free thruster designs such as those of Takahashi et al., Shabshelowitz et al., and Williams et al., which achieved the same thrust at much higher flow rates, RF power levels (up to 2,000 W), and thruster size/mass (up to 50 kg).[3, 24, 25]

FIG. 14B shows the specific impulse of the FSCH-RFT unit as a function of RF input power. Specific impulse is a measure of thruster efficiency with respect to fuel usage. The FSCH-RFT unit achieved between 4 to 6 times improved specific impulse at 120-125 W compared to existing electric thruster designs. These results demonstrate that the FSCH-RFT is an extremely high-performing design in this category of thrusters. Specifically, the FSCH-RFT specific impulse per Watt is up to 3,000% greater than every other electrode-less RF thruster tested as described in reference 28.

It will be appreciated by persons having ordinary skill in the art that many variations, additions, modifications, and other applications may be made to what has been particularly shown and described herein by way of embodiments, without departing from the spirit or scope of the invention. Therefore, it is intended that scope of the invention, as defined by the claims below, includes all foreseeable variations, additions, modifications or applications.

REFERENCES

1) Longmier, et al., *J. Propulsion Power*, 27(4): 915-920, 2011.
2) Choueiri, et al., 36$^{th}$ *AIAA/ASME/SAE/ASSE Joint Propulsion Conference & Exhibit*, AIAA 2000-3759, July 2000.
3) Takahashi, et al., *Appl. Phys. Lett.* 98: 141503, 2011.
4) Dedrick, et al., *Phys. Plasmas*, 24: 050703, 2017.
5) Nishiyama, et al., *Joint Conference of 30$^{th}$ International Symposium of Space Technology and Science 34$^{th}$ International Electric Propulsion Conference and 6$^{th}$ Nano-Satellite Symposium*, IEPC-2015-333, July 2015.
6) Cannat, et al., *Phys. Plasmas*, 22: 053503, 2015.
7) Hopwood, *Plasma Sources Sci. Technol.* 1: 109-116, 1992.
8) Bonoli, *Phys. Plasmas*, 21: 061508, 2014.
9) Gilland, et al., *Plasma Sources Sci. Technol.*, 7:416-422, 1998.
10) Magee, et al., *Phys. Plasmas*, 19: 123506, 2012.
11) Siddiqui, et al., *Plasma Sources Sci. Technol.*, 24: 034016, 2015.
12) Loiu, et al., *Solid State Electronics*, 47: 1881-1895, 2003.
13) Scime et al., *J. Plasma Phys.*, 2015.
14) Kinder, et al., *J. Appl. Phys.*, 90(8), 2001.
15) Chen, F. F., *Introduction to Plasma Physics and Controlled Fusion*, Plenum Press, New York, N Y, 1984.
16) Huba, J. D., *NRL Plasma Formulary*, Naval Research Laboratory, Washington D.C., 2009.
17) Chen, *Plasma Sources Sci. Technol.*, 24:014001, 2015.
18) Stephan, et al., J. Chem. Phys., 81(7), 1984.
19) Hofer, et al., 27$^{th}$ *International Electric Propulsion Conference*, IEPC-01-020, October 2001.
20) Ellingboe, et al., *Phys. Plasmas*, 2: 1807-1809, 1995.
21) Chen, et al., *Phys. Rev. Lett.*, 80(21): 4677-4680, 1999.
22) Choi, Microsemi Application Note 1811, 2013.
23) Collard et al., "A Numerical Examination of the Performance of Small Magnetic Nozzle Thrusters." 53$^{rd}$ *AIA/SAE/ASEE Joint Propulsion Conference*, AIAA 2017-4721, July 2017.
24) Shabshelowitz et al., *J. Prop. Power*, 29:919, 2013;
25) Williams et al., *J. Prop. Power*, 29:520, 2013.
26) Siddiqui et al., "First Performance Measurements of the Phase Four RF Thruster," IEPC-2017-431, (2017).
27) Hsu Schouten et al., "Performance of a Torsional Thrust Stand with 1 uN Sensitivity," IEPC 2015-90062 (2015)).
28) Siddiqui, M. U., "Updated Performance Measurements of the Phase Four RF Thruster," 34$^{th}$ *Space Symposium*, April 2018.

What is claimed is:

1. A plasma production device comprising:
(a) a plasma production chamber having a cylinder body, a first closed end and a second open end;
(b) a magnet system comprising one or more magnets configured to establish a magnetic field within the plasma production chamber, the magnetic field comprising magnetic field lines oriented parallel to a central longitudinal axis of the plasma production chamber with a magnetic field strength that is continuously decreasing from the first closed end to the second open end, each magnet of the one or more magnets producing a magnetic field of a same polarity within the plasma production chamber, wherein the one or more magnets comprises at least one radial magnet located proximate the second open end and distal the first closed end and at least one additional magnet located proximate the first closed end and distal the second open end, wherein the second magnet is another of the at least one radial magnets or at least one planar magnet;
(c) a propellant tank and a flow regulator in communication with the plasma production chamber and configured to deliver a gaseous propellant into the plasma production chamber; and
(d) a radio frequency (RF) antenna comprising a flat spiral region external to the plasma production chamber and disposed on an external surface of the first closed end, electrically coupled to an AC power source, and configured to deliver an RF energy to an interior region of the plasma production chamber to ionize the gaseous propellant and heat generated plasma produced therefrom by inductive heating;
wherein a radius ($R_L$) of the plasma production chamber is selected from a range between a minimum radius and a maximum radius, the range configured to provide an increased efficiency of the plasma production device,
wherein the minimum radius is a predetermined average Larmor orbit radius (Pi) of ions of the generated plasma, the minimum radius configured to allow complete orbits of the ions and electrons in the production chamber,
wherein the maximum radius is two to ten times a predetermined skin depth (Ps) of the RF energy,
wherein the RF energy ionizes and heats a majority of the gaseous propellant within the cylinder body inductive heating, and
wherein the plasma production device is electrodeless and produces a primary source of thrust by ambipolar acceleration of the ions exiting the second open end.

2. The plasma production device of claim 1,
wherein the flat spiral region is formed by 1-10 turns that expand within a plane of the flat spiral region in a radial direction from a center point of the flat spiral region, and
wherein the plane of the flat spiral region is perpendicular to the longitudinal axis of the plasma production chamber.

3. The plasma production device of claim 2,
wherein the flat spiral region comprises a spiral region radius and the first closed end comprises a closed end radius,
wherein the center point of the flat spiral region is disposed on a center point of the first closed end, and
wherein the spiral region radius is 50%-100% of the closed end radius.

4. The plasma production device of claim 1, wherein the spiral region is configured to cause a constructive interference in magnetic fields produced within the plasma production chamber.

5. The plasma production device of claim 2,
wherein the RF antenna further comprises a coiled region disposed on the external surface of the cylinder body,
wherein the coiled region extends along the longitudinal axis of the plasma production chamber, and
wherein the coiled region is selected from the group consisting of a coil, a helix, and a half-helix.

6. The plasma production device of claim 5, wherein the coiled region has 2-50 turns.

7. The plasma production device of claim 5, wherein the coiled region and the flat spiral region are wound in the same direction.

8. The plasma production device of claim 5, wherein the coiled region and the flat spiral region are wound in a right-handed direction.

9. The plasma production device of claim 5, wherein the flat spiral region and the coiled region are configured to cause a constructive interference in magnetic fields produced within the plasma production chamber.

10. The plasma production device of claim 1, wherein the RF energy has a sufficiently low RF energy frequency in a range of 3-300 MHz to avoid a resonant effect with particle motions in the generated plasma.

11. The plasma production device of claim 1, wherein the magnet system further comprises the at least one planar magnet, and wherein the at least one planar magnet is disposed upstream of the first closed end.

12. The plasma production device of claim 10, wherein the RF energy frequency is less than 25% of an electron cyclotron frequency ($f_{ee}$) inside the plasma production chamber.

13. A plasma production device comprising:
(a) a plasma production chamber having a cylinder body, a first closed end and a second open end;
(b) a magnet system comprising one or more magnets configured to establish a magnetic field within the plasma production chamber, the magnetic field comprising magnetic field lines oriented parallel to a central longitudinal axis of the plasma production chamber each of the one or more magnets producing a magnetic field of a same polarity within the plasma production chamber, wherein the one or more magnets comprises at least one radial magnet located proximate the second open end and distal the first closed end and at least one additional magnet located proximate the first closed end and distal the second open end, wherein the second magnet is another of the at least one radial magnets or at least one planar magnet;
(c) a propellant tank and a flow regulator in communication with the plasma production chamber and configured to deliver a gaseous propellant into the plasma production chamber; and
(d) a radio frequency (RF) antenna comprising a flat spiral region external to the plasma production chamber and disposed on an external surface of the first closed end, electrically coupled to an AC power source, and configured to deliver an RF energy to an interior region of the plasma production chamber to ionize the gaseous propellant and heat generated plasma produced therefrom by inductive heating;
wherein a radius ($R_L$) of the production chamber is selected from a range between a minimum radius and a maximum radius, the range configured to provide an increased efficiency of the plasma production device,
wherein the minimum radius is a predetermined average Larmor orbit radius (Pi) of ions of the generated plasma, the minimum radius configured to allow complete orbits of the ions and electrons in the production chamber,
wherein the maximum radius is two to ten times a predetermined skin depth (Ps) of the RF energy,
wherein the RF energy ionizes and heats a majority of the gaseous propellant within the cylinder body by inductive heating, and
wherein the plasma production device is electrodeless and produces a primary source of thrust by ambipolar acceleration of the ions exiting the second open end.

14. The plasma production device of claim 13, wherein the cylinder body has a length of 20-75 mm.

15. The plasma production device of claim 13, wherein the plasma production chamber radius ($R_L$) is 5-20 mm.

16. The plasma production device of claim 13, wherein the magnet system produces a minimum magnetic field strength of 250-400 Gauss.

17. The plasma production device of claim 13, wherein the RF energy has a sufficiently low frequency in a range of 3-300 MHz to avoid a resonant effect with particle motions in the generated plasma.

18. The plasma production device of claim 13, wherein the AC power source has a power of 25-500 W.

19. The plasma production device of claim 13, wherein the gaseous propellant is xenon.

20. The plasma production device of claim 13, wherein the magnet system further comprises the at least one planar magnet.

21. The plasma production device of claim 13, wherein the magnet system produces a first throat region and a second throat region within the plasma production chamber, and the first throat region and the second throat region are separated by a plasma containment region having a lower magnetic field strength than either of the first throat region or the second throat region.

22. The plasma production device of claim 13, wherein the magnet system produces a magnetic field strength that is continuously decreasing from the first closed end toward the second open end.

* * * * *